United States Patent
Fano et al.

(10) Patent No.: US 7,231,608 B1
(45) Date of Patent: Jun. 12, 2007

(54) FINANCIAL MANAGER USER INTERFACE AS FILED

(75) Inventors: Andrew E. Fano, Evanston, IL (US); Scott W. Kurth, Wheeling, IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/520,580

(22) Filed: Mar. 8, 2000

(51) Int. Cl.
G09G 5/00 (2006.01)

(52) U.S. Cl. ...................... 715/760; 715/764

(58) Field of Classification Search ............... 345/760, 345/761, 763, 772, 810, 811, 835, 962, 700; 705/7–10, 36; 715/760, 761, 772, 962
See application file for complete search history.

(56) References Cited

U.S. PATENT DOCUMENTS

| | | | |
|---|---|---|---|
| 5,918,217 A | 6/1999 | Maggioncalda et al. | |
| 5,999,918 A | 12/1999 | Williams et al. | |
| 6,012,043 A | 1/2000 | Albright et al. | |
| 6,012,044 A * | 1/2000 | Maggioncalda et al. | 705/26 |
| 6,021,397 A * | 2/2000 | Jones et al. | 705/36 |
| 6,064,984 A * | 5/2000 | Ferguson et al. | 345/700 |
| 6,236,975 B1 | 5/2001 | Boe et al. | |
| 6,253,192 B1 | 6/2001 | Corlett et al. | |
| 6,349,290 B1 | 2/2002 | Horowitz et al. | |
| 2001/0044739 A1 | 11/2001 | Bensemana | |

OTHER PUBLICATIONS

Booker, Ellis, "A Think-Tank Vision," InternetWeek.com, Sep. 10, 1999, pp. 1-3, retrieved from www.internetwk.com.

Epstein, Eve, "Converging Future," InfoWorld News, Mar. 7, 2000, pp. 1-8, retrieved from http://sandbox.xerox.com.

Fano, A.E., "Shopper's Eye," ACM, 1998, pp. 1-2, retrieved from: Dialog, File 2.

Fano, Andrew Ernest, "A strategy-based throry of planning for goal-based scenario-learning environments," Dissertation Abstracts International, 1996, vol. 57/11-B, 1 page, retrieved from Dialog, File 35.

"GE Center for Financial Learning; Planning Tools, How much am I Spending?" Internet Article, 'Online! 1000-2000.XP002181097, Retrieved from the Internet: <6URL:http://www.financiallearning.com/ge/calculater.jsp?osp=9705
&BV_SessionID=@@@@61126282150.
1003930066@@@@BV_EngineID=cadccfkmghkgbedcgceckh.
0> 'retrieved on 2001-10-24! page: Your Money Personality, Prioritized Spending Plan.

Bacchus, F; Froduald Kabanza: "Planning for Temporally Extended Goals" Proc. of the 13th Intern. Conference On AI, 1996, p. 1215-1222 XP002181096 Portland, whole document.

(Continued)

Primary Examiner—Kristine Kincaid
Assistant Examiner—Thanh Vu
(74) Attorney, Agent, or Firm—Oppenheimer Wolff & Donnelly LLP

(57) ABSTRACT

The present invention provides for a user interface of changeable images of selected goals from a plurality of goals, each image changing in appearance based upon preferences selected for each selected goal. First, a plurality of images are displayed in a frame. Each of the images represent a goal of a user. In operation, the user is permitted to select from the images in the frame. Further, a user is permitted to adjust preferences related to the goal represented by the selected image in the frame. The appearance of one or more of images in the frame is then altered based on the adjusted preferences of the goal represented by the selected image.

20 Claims, 18 Drawing Sheets

OTHER PUBLICATIONS

Bellone, Robert, "Forecast your clients; financial future", Accounting Technology, 04-1996 [retrieved Jun. 18, 2002], vol. 12, Issue 3, 6 pages, Retrieved from: Proquest Direct.

Carey, Theresa, "Putting the brains in your PC", Barron's Dec. 7, 1998 [retrieved Jun. 18, 2002], vol. 78, Issue 49, 4 pages, Retrieved from Proquest Direct.

Deb, Kalyanmoy: "Solving goal programming problems using multi-objective genetic algorithms" Proceedings of the Congress on Evolutionary Computing, Jul. 6, 1999-Sep. 9, 1999, p. 77-84 XP002181095, p. 77-p. 81.

Meahdra, Michael: "The ABC's of Netscape Composer" 1997, Sybex, San Fransisco-Paris-Düsseldorf-Soest, XP002181098, ISBN 0-7821-2065-2, p. 15-p. 66.

Nelson, Stephen L., "Quicken 98 for Windows for Dummies" IDG Books Worldwide, Inc., 1997.

Probst, G.: "Gérez votre budget familial sur FX-702 P" Micro-Systems, no Avril, 1983, pp. 133-135, XP001018760 whole document.

Waldron, Heather C., "The game of life", Limra's Marketfacts, Fall 1997 [retrieved Jun. 18, 2002] vol. 16, Issue 5, 5 pages, Retrieved from: Proquest Direct.

Waller, Karyn M., "Filling the knowledge gap", Jorunal of Accountancy, Apr. 1999 [retrieved Jun. 21, 2002], vol. 187, Issue 4, pp. Retrieved from: Proquest Direct.

Weverka, Paul, "Microsoft Money 98 for Dummies", IDG Books Worldwide, Inc., 1997, pp. 21-29, 59-79, 149-161, and 207-229.

* cited by examiner

Figure 11

FINANCIAL MANAGER USER INTERFACE AS FILED

FIELD OF THE INVENTION

The present invention relates to financial planning and more particularly to a financial manager user interface.

BACKGROUND OF THE INVENTION

Historically, consumers have conducted most of their exchange transactions through non-electronic means. The use of non-electronic means of exchange requires manual record keeping in order to collect, collate, and analyze data on the sources and uses of funds. This has resulted in substantial expenditures for accounting by virtually all consumers. For example, at the end of each month many consumers try to: compile records of the amount of cash paid to providers of goods and services, balance their check book and collate all their credit card receipts and compare them to statements received from each card issuer. The consumer then determines whether she is over, under, or on budget. Despite a proliferation of personal financial management software in recent years, no means have been developed to eliminate the time and expense of data collection and entry or to enhance on-line financial management.

Banks and other financial intermediaries have offered consumers only standardized financial service products. The standardization of financial products reduced data processing and marketing costs for financial institutions, but resulted in financial services that were often ill-suited for consumers. For example, mortgage lending against homes has been practiced for many years, but only very recently have several new financial products been introduced in an effort to make mortgage lending more attractive to financial institutions, and to make housing more affordable to prospective homeowners. Additionally, many of the terms of the financial service products are fixed and inflexible. These products have not afforded consumers the ability to alter their consumption, investment or savings behavior to best suit their own or the economy's changing circumstances.

Moreover, product proliferation in the financial services market has presented the consumer with a confusing array of choices without a convenient, objective or clearly documented means of selecting the best combination of financial services to realize the consumer's financial objectives. Individual purveyors of financial services have often solicited customers and marketed their products on an ad hoc basis. Financial institutions usually possess only limited knowledge of the customer's total financial condition and hence they often try to sell a product that is most advantageous to the institution, not the customer. Moreover, at the present time customers must spend a substantial amount of time coordinating and monitoring their holdings of many different financial services from many different suppliers. In essence, consumers today are required to be the systems integrator for the disparate data processing systems of their financial providers. Few individuals have the time, interest or ability to perform this difficult task well.

Despite the development of some new financial products, such products have not succeeded in meeting the goals of either the mortgagor or the financial institutions. For example, financial institutions have traditionally lent funds to individuals on a fully secured basis, with an interest rate greater than their cost of funding the loan. In the last few years, however, the financial industry has been deregulated making it possible for a variety of financial institutions and firms that market financial services (hereinafter referred to as "financial institutions") to sell an entire range of financial products. Thus, in addition to the traditional objectives of a mortgagee, many financial institutions now view mortgage lending as a vehicle to encourage the borrower to purchase one or more financial service products. Methods are needed, however, to facilitate the provision of one or more financial services in an efficient and comprehensible manner.

From the point of view of the consumer, problems remain concerning the relative inflexibility of financial service products. Rapidly changing international, domestic, and personal economic circumstances require flexibility in financial service products. This allows the consumer the ability to adjust her asset and liability holdings and the terms of financial obligations to take best advantage of such changing circumstances. Many financial service products were developed at a time when it would have been impossible for a financial intermediary to offer customized, derivative or synthetic financial service products (hereinafter referred to as "derivative products") to individual consumers. With the advent of recent significant advances in information technology, it is possible for financial intermediaries to offer derivative financial service products to individual consumers in accordance with the individual's financial resources, forecast future income and expenses, and attitude toward investment risk.

For example, consider the relative inflexibility of the traditional fixed rate mortgage. (Here, "mortgage" means the entire relationship between the financial institution and the borrower: the loan, the security interest and the contractual obligation to pay the loan. In other contexts, the term "mortgage" will be used in its traditional sense to refer to a conditional transfer of real property to secure a loan.) The standard fixed rate thirty year mortgage was developed in part because it provided a standardized financial service product with constant monthly payments. Thus, it was cost effective for a financial service intermediary to offer its customers. It was structured to accommodate the accounting or data processing department of the bank or thrift institution as opposed to the best interest of the consumer. The mortgagor is locked in to an inflexible payment schedule which typically extends over most of the years in which he is working. This is analogous to a shoe store offering only one size and type of shoe. Under this arrangement, the shoe store realizes significant cost efficiencies at the expense of its customer's comfort.

The wide variety of individuals' financial resources and investment risk outlooks requires financial service products to be both tailored to the current needs of individuals and sufficiently flexible to accommodate future variations in their requirements. In addition, the constantly changing nature of an individual's financial circumstances, the financial markets, and the applicable income and estate tax regulations demand flexible financial service products.

Products currently offered do not take advantage of recent advances in information and problem solving technologies. Nor do they take advantage of the deregulation of the financial services industry. Moreover, financial service products do not adequately accommodate either the diversity or the constantly changing nature of individuals' financial preferences or circumstances. Financial service products are not offering the consumer a full range of financial services that would help maximize his financial return and make housing affordable to a greater number of individuals.

In addition to the failing of the financial service product offerings, there are certain fundamental problems with the methods and apparatus currently used to effect the exchange of goods and services, savings, investments and borrowing. Currently in the United States, there are 25,000 depositories and approximately 266 million individuals. Based upon an analysis made by two officials of the Federal Reserve, (Humphrey, David B. and Berger, Allen N. "Market Failure and Resource Use: Economic Incentives to Use Different Payment Instrument," 1990), approximately 97 percent of all payments are made by either cash or check, of which cash payments are 83.42 percent of the total and check transactions are equal to 14.04 percent. Credit cards account for only 1.52 percent of all transactions. Only 0.34 percent of all payments are made electronically in the United States. Clearly, the small percentage of credit card and electronic payments reveal a critical failing in the current methods employed to effect these methods of exchange.

Cash payments total 278.6 billion transactions per year, whereas those made by check are equal to 47 billion and those made by credit card are 5.11 billion. Because of the differences in the amount of the transactions, however, there is a greater dollar value with respect to transactions made by check, as opposed to cash. There were $55.8 trillion in checking transactions as opposed to only $1.4 trillion in cash and $0.317 trillion by credit card. The average size of a check transaction is $1,188, the average size of a credit card transaction is $62 and the average size of a cash transaction is only $5.

Recent studies from the Federal Reserve Board suggest an economic rationale which explains why consumers pay by check where larger dollar amounts are involved. They stated that, because of the benefits of the "float" which approximates 3.7 days for each checking transaction, consumers and businesses have an incentive to use checks for larger transactional payments. However, another compelling reason for consumers to use checks is that consumers are afforded, albeit in an archaic manual form, a means of record keeping for their transactions that is contemporaneous with the execution of the transaction. With cash transactions, obviously, that type of convenience and contemporaneous record keeping does not occur. With regard to transactions utilizing credit cards, although one receives a piece of paper, the transactions are not incorporated into any kind of systematic accounting that is held or may be easily accessed by the consumer. It is our view that this record keeping feature makes check transactions the most significant dollar value means of exchange in the United States. When the amount of money spent matters, consumers prefer to have a record of the transaction.

Officials from the Federal Reserve Board have estimated the production and processing cost of cash transactions in the United States at approximately $11.27 billion. Transactions paid by check cost considerably more, $37.366 billion. Transactions paid by credit card cost $4.5 billion. This equates to a production and processing cost per transaction of $0.04 for every cash transaction, $0.79 for every transaction made by check and $0.88 for every transaction made by credit card. These cost estimates represent the direct production and processing costs that are ultimately borne by the consumer. They do not, however, include the attendant costs required for a consumer to then efficiently serve as the systems integrator for her banks, brokers, insurers and merchants. The consumer is left to aggregate disparate data from cash, check and credit card transactions into an amenable financial plan and integrate this information to satisfy annual reporting requirements such as tax returns to the treasury.

In addition to the approximately $50 billion cost of production and processing exchange transactions, currently there is no adequate means of assuring the security of transactional data, and tracking that data and compiling it for review. Credit card fraud losses are estimated to amount to $70 billion per year in the U.S. alone. Unreported cash transactions are estimated to defraud the U.S. Government of $150 billion in annual tax revenue. These annual fraud-related losses are approximately equal to the projected annual federal budget deficit. The current system of exchange and security verification revolves around the use of a social security number, name, address and credit card or checking account number. In other words, authentication of identity is almost solely based upon numeric or alphanumeric data. Once a criminal has misappropriated some or all of this data, he can effect almost any transaction and can effectively control an individual's assets, liabilities, and accounts.

Currently, there is no convenient or adequate means of tracking transactional data for consumption, savings, investments, bonuses, discounts and rebates associated with these activities. This is financially injurious to the U.S. Treasury, and it is very inconvenient for consumers. Billions of hours of citizens' time is spent compiling data for tax returns. Millions of hours of IRS officials' time is spent checking them for accuracy. James L. Payne in Costly Returns has estimated the annual cost of tax compliance in the United States alone at $360 billion. Moreover, under the current system of exchange it is impossible for economic policy makers to get an accurate real time reading on the state of the economy, and consequently, economic policy is frequently ill-timed and misguided.

Data is also not compiled and presented in a manner that allows individuals to make the appropriate informed decisions about their consumption, savings and investment behavior. This makes it difficult for consumers to properly visualize the value of their potential savings and investment. This has led to a consumption-based society with inadequate levels of personal savings, potentially resulting in disastrous long term consequences for the American economy and society at large.

Furthermore, this excessive reliance on paper-based transactional media has an adverse environmental impact and may, according to certain studies, directly contribute to global warming. There is a significant adverse environmental impact of the paper currency and paper check-based society. Credit and debit cards also generate paper and carbon based transactional reporting media. None of the current forms of exchange provide a sufficient benefit for consumers to change their modes of transactional behavior.

The current system of exchange, savings, investment and borrowing makes it very difficult to adequately manage risk exposure for and by consumers, banks, and the U.S. Government. Accordingly, each year, approximately 10 million individuals are forced to file bankruptcy; financial institutions incur substantial bad debt losses; and the U.S. government is forced to write off uncollectible tax revenues.

The aggregate production and processing cost of the current system of exchange in the United States is estimated by Federal Reserve officials to be in excess of $60 billion each year. However, as demonstrated above, the total direct and indirect social, economic and environmental costs associated with the predominantly cash and check-based current system are far greater.

SUMMARY OF THE INVENTION

The present invention provides for a user interface of images of selected goals from a plurality of goals, each image changing in apperance based upon preferences selected for each selected goal. First, a plurality of images are displayed in a frame, each of the images representing a goal of a user. In operation, the user is permitted to select from the images in the frame. Further, a user is permitted to adjust preferences related to the goal represented by the selected image in the frame. The appearance of one or more of images in the frame is then altered based on the adjusted preferences of the goal represented by the selected image. In a further embodiment, a personal profile is created corresponding to the adjusted preferences of the user.

BRIEF DESCRIPTION OF THE DRAWINGS

FIG. 11 illustrates a personal profile frame which is displayed upon selection of a personal profile button of the main frame in accordance with an embodiment of the present invention;

DETAILED DESCRIPTION OF THE PREFERRED EMBODIMENTS

Figure 1:
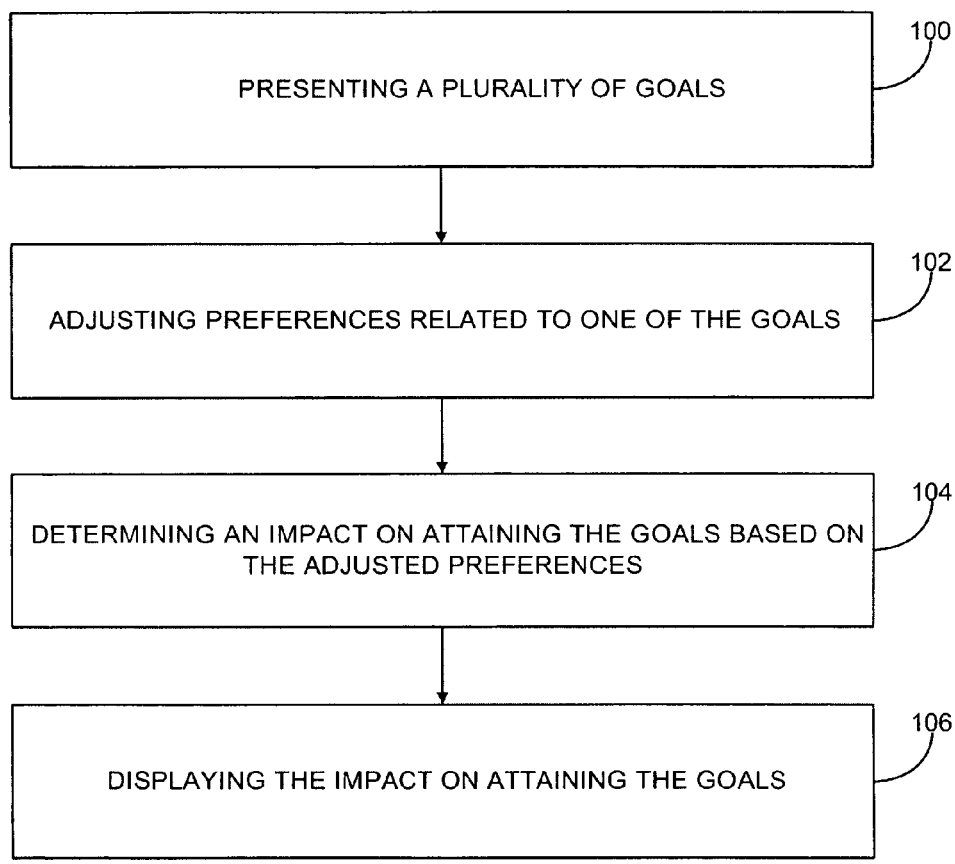
FIG. 1 is a flowchart illustrating a method of managing finances in accordance with an embodiment of the present invention.

FIG. 1 is a flowchart illustrating a method of managing finances in accordance with one embodiment of the present invention. First, in operation 100, a plurality of financial goals are presented to a user. The goals may be previously selected by the user or may include a default set of goals, for example. The user is then permitted to adjust preferences related to a selected one or more of the financial goals. See operation 102. An impact on attaining some or all of the financial goals is determined based on the adjusted preferences, as indicated in operation 104. Then, in operation 106, impact on attaining the financial goals is then displayed to the user.

In one aspect of the present invention, information about the user is received and used to provide a basis for the financial goals of the user. Such information about the user may include information relating to at least one of: a name of the user, age of the user, location of the user (such as the city of residence), marital status of the user (married, single, or divorced), housing status of the user (own or rent), income of the user, and/or number of dependents of the user (such as how many children the user has).

In another aspect of the presenting invention, the financial goals include at least one of: a home, vehicle, monthly allowance and savings, planned furniture expenses, planned appliance purchases, vacation, children's education, and/or retirement home. It should be noted that the present invention need not be limited to financial goals, or any particular type of goal for that matter. Just by way of example, work goals, life-oriented goals, etc. may fall within the scope of the present invention.

As an option, the adjustment made to the preferences can include adjusting a degree of favoritism between time and quality by the user. In other words, if the user selects to favor a shorter time to achieve the goal more over the quality of the goal, then concessions in quality and improvements in time will tend to be made. In contrast, if the user selects to favor quality more over time, then concessions in time and improvements in quality will tend to be made.

As another option, the step of adjusting preferences includes adjusting a priority for the selected goal. By adjusting the priority higher, it makes it more likely that the user's expectations for the particular goal are met. However, it does not necessarily mean that the user will get the most expensive option for that particular goal.

In yet another aspect of the present invention, an adjustment is made by the user to a time expectation for the amount of time expected to achieve the selected goal. The higher the time expectation, the sooner in time the user expects to achieve the selected goal. A quality expectation may be adjusted by the user for the degree of quality expected for the selected goal. The higher the quality expectation, the better the option wanted by the user. As an option, the impact on attaining the financial goals may include displaying a summary of changes in achieving the financial goals as a result of the adjusted preferences. Also optionally, a default profile may be selected and used as a basis for the financial goals.

The present invention thus provides a tool that allows one to navigate through a space of likely outcomes (i.e. goal configurations) from the much larger space of possible outcomes. This is enabled by modeling the tradeoffs one would likely make based on one's preferences. The user is better at recognizing outcomes they like than they are at accurately assessing their preferences. The iterative adjustment of their preferences provided by the present invention is a way to navigate to an outcome in a manner that they like.

The present invention provides a financial planner and portal that lets a user manage money. The present invention allows one to manage finances by adjusting goals and examining the impact on other goals. Goals may relate to any purpose toward which an endeavor is directed such as retirement, vacations, education, and home, to name a few.

In a case example of the present invention, a user may plan on getting a Camry in a year. The user may also indicate that he or she wants to upgrade to a BMW. Based on the preferences you've entered over time, the present invention readjusts other goals and graphically shows these other goals becoming easier or harder to obtain. In this case example, the user sees that he or she may have to wait six more months for the car, and go to Disney World instead of Club Med this year. The present invention thus shows which compromises need to be made to obtain goals, handles financing changes, and determines which transactions need to be made.

Figure 2:
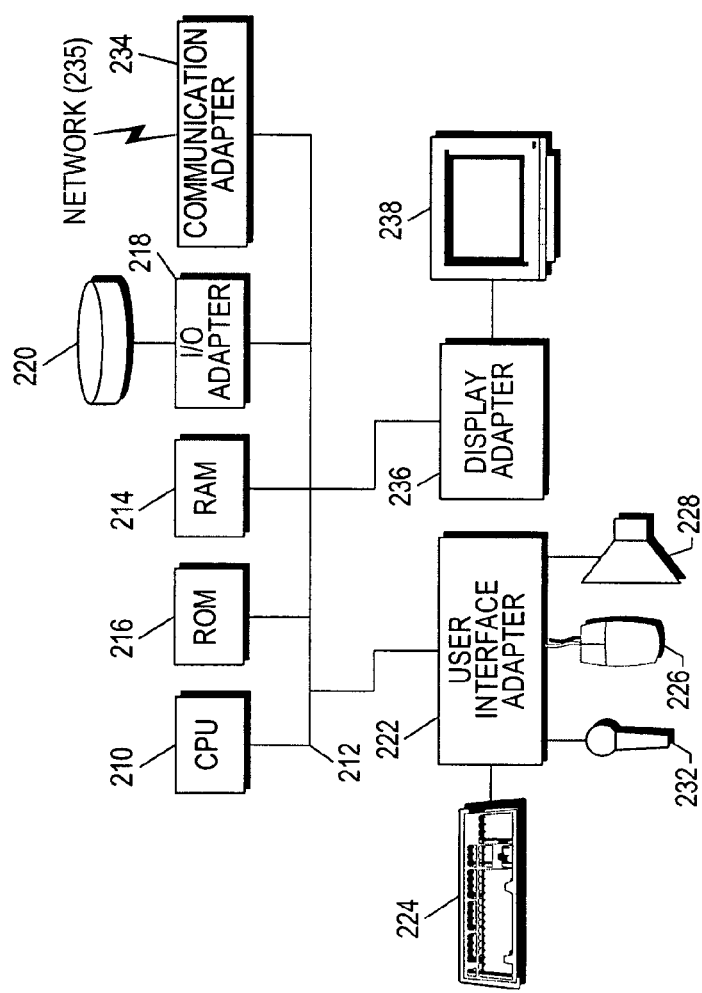
FIG. 2 is an exemplary hardware configuration associated with the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 2, which illustrates a typical hardware configuration of a workstation in accordance with a preferred embodiment having a central processing unit 210, such as a microprocessor, and a number of other units interconnected via a system bus 212. The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 134 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:
Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.
Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.
Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:
Poor performance;
Restricted user interface capabilities;
Can only produce static Web pages;
Lack of interoperability with existing applications and data; and
Inability to scale.
Sun Microsystem's Java language solves many of the client-side problems by:
Improving performance on the client side;
Enabling the creation of dynamic, real-time Web applications; and
Providing the ability to create a wide variety of user interface components.
With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Four years from now 25% of U.S. households are expected to be using online banking and bill presentment. What will these applications be like? How can we expect them to change over time?

Personal Choice Point illustrates a potential direction for such applications and highlights new opportunities. Historically, financial applications have been limited by the information they have had available and the actions they could effect. The result were applications that relied on user input for all their information, and produced only high level, long term plans for the user to implement, such as retirement savings recommendations.

Over time, the constraint on information access has eased, enabling new applications such as portfolio tracking. Similarly, we have witnessed tremendous growth in the repertoire of potential actions financial applications can perform on behalf of users—actions such as ordering payments, purchasing stocks and goods and entering bids in auctions.

Naturally, we have started to see applications that take advantage of progress in both of these dimensions. Stock trading web sites provide both volumes of information and the ability to execute trades. Many sites now exist that handle all aspects of a consumer's task, or "intention". Sites such as CarPoint will help a customer with all aspects of a car purchase, from identifying an appropriate car, to finding a good deal, to buying insurance, and obtaining a loan. Several travel sites, such as Travelocity, will provide similar service for planning vacations.

Personal Choice Point represents a natural progression of such applications. The above mentioned sites handle all aspects of a user's task, but do so in isolation. Personal Choice Point not only helps you address a particular task, but addresses the interactions and conflicts that arise between tasks over time. By focusing your attention on these issues, and taking over the nuts and bolts of day to day financing and individual transactions, Personal Choice Point allows you to think about what matters most: the lifestyle choices we all make.

DETAILED DESCRIPTION OF OPERATION

The present invention redefines the relationship between financial services companies and consumers from account management to lifestyle management. The present invention is a financial management application that works not just by using information about a user's finances, but by responding appropriately to a wealth of information about current, upcoming, and long-term goals and preferences. This information can be used for many applications that will now be set forth.

Figure 2A:
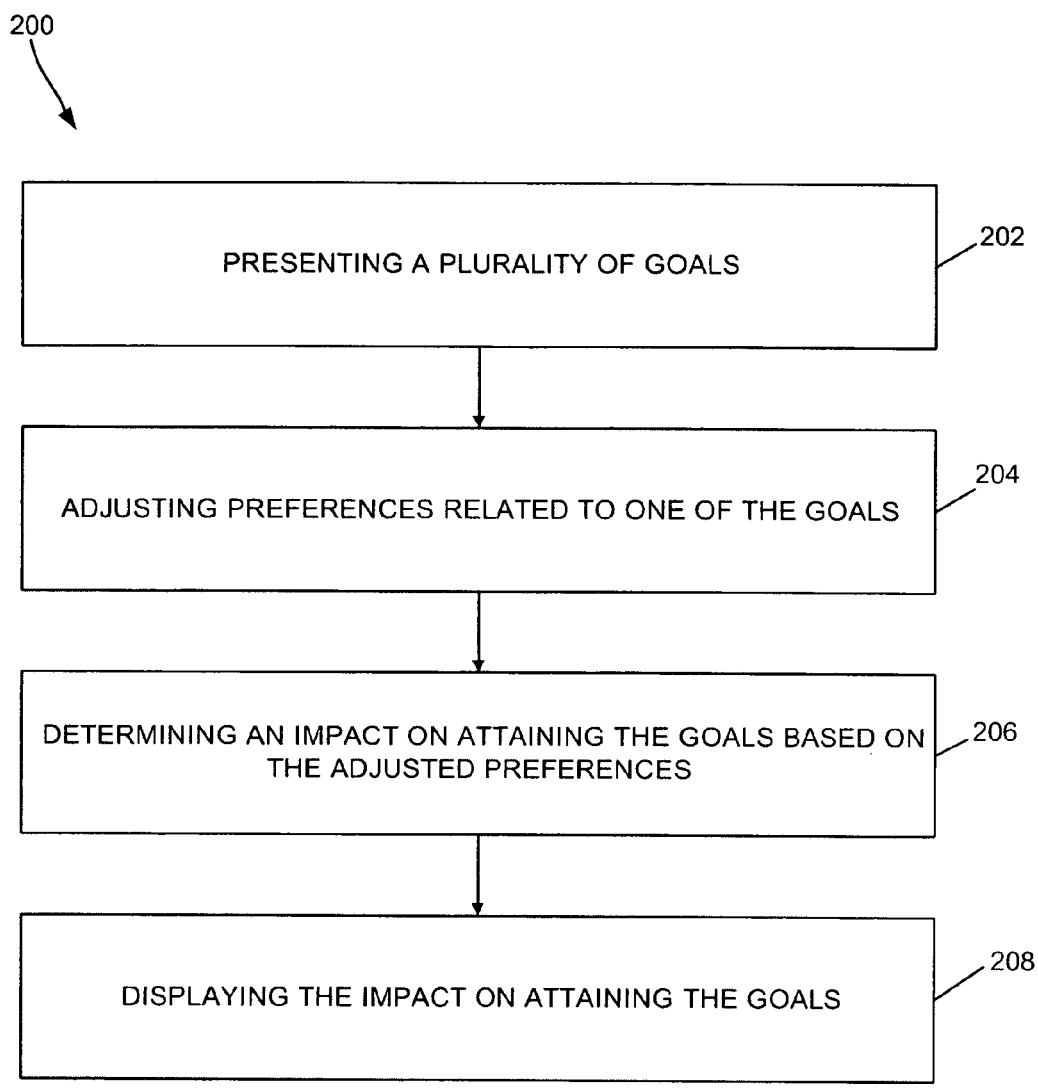
FIG. 2A is a flowchart that illustrates a method for balancing attainment of financial goals in accordance with an embodiment of the present invention.

FIG. 2A is a flowchart that illustrates a method for balancing attainment of financial goals. First, in operation 200, target advertising is provided in a financial manager executed on a computer. Next, in operation 202, customized financial instruments are providing in the financial manager. Still yet, user profile information is obtained in the financial manager for facilitating the targeting advertising and providing customized financial instruments. See operation 204. Further information will now be set forth regarding the foregoing operation in the following FIGS. 3–5.

Figure 3:
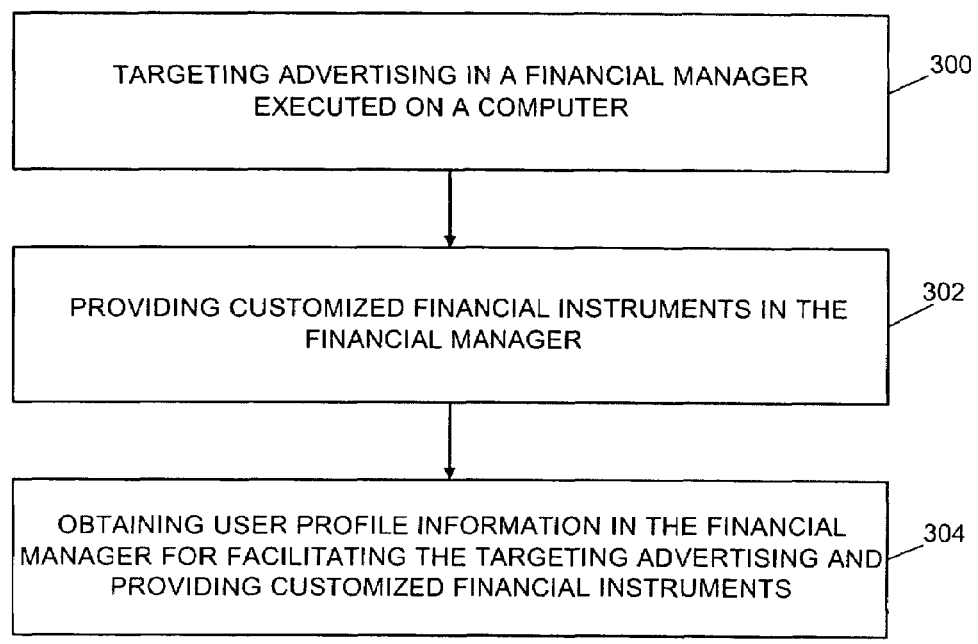
FIG. 3 is a flowchart illustrating a method for targeting advertising in a financial manager in accordance with an embodiment of the present invention.

FIG. 3 is a flowchart illustrating a method for targeting advertising in a financial manager in accordance with an embodiment of the present invention. Financial goals of a user are first received utilizing a network in operation 300. The user may be a user of the network in operation 302. In operation 304, personal information about the user is subsequently received utilizing the network. The financial goals and personal information of the user are then matched with at least one offering for helping to achieve the financial goals of the user. See operation 306. Information relating to the matched offering is transmitted to the user utilizing the network in operation 308. Such information can include any manner of advertising, including but not limited to such things as: hyperlinks, browser banner advertisements, pop-up windows, facsimiles, etc.

Preferably, the user is allowed to adjust preferences related to attaining one or more of the financial goals of the user. More preferably, the adjusted preferences includes at least one of quality preference relating to the quality of the achieved financial goal preferred by the user, and a time preference relating to how soon the user prefers to achieve the financial goal.

As an option, at least one provider of the offering is notified when preferences relating to attaining one or more of the financial goals are changed by the user. As another option, the offering can include a product and/or a service for helping attain the financial goal. The products and services should also be matched to the adjusted preferences. Advertising relating to the offerings could also include promotions, sales, discounts, services available, offers for trade, etc.

In one aspect of the present invention, the financial goals of the user include future purchases made by the user. The financial goals include at least one of: a home, vehicle, monthly allowance and savings, planned furniture expenses, planned appliance purchases, vacation, children's education, and retirement home.

The present invention thus precisely market products and services to the right people at the right time in support of their intentions. Most immediately, if the present invention knows when a user intends to buy a car, it knows when the user needs a car loan. But ultimately the financial services company is now in the perfect position to provide the car itself—or any products and services associated with a goal—rather than just financing them.

Figure 4:
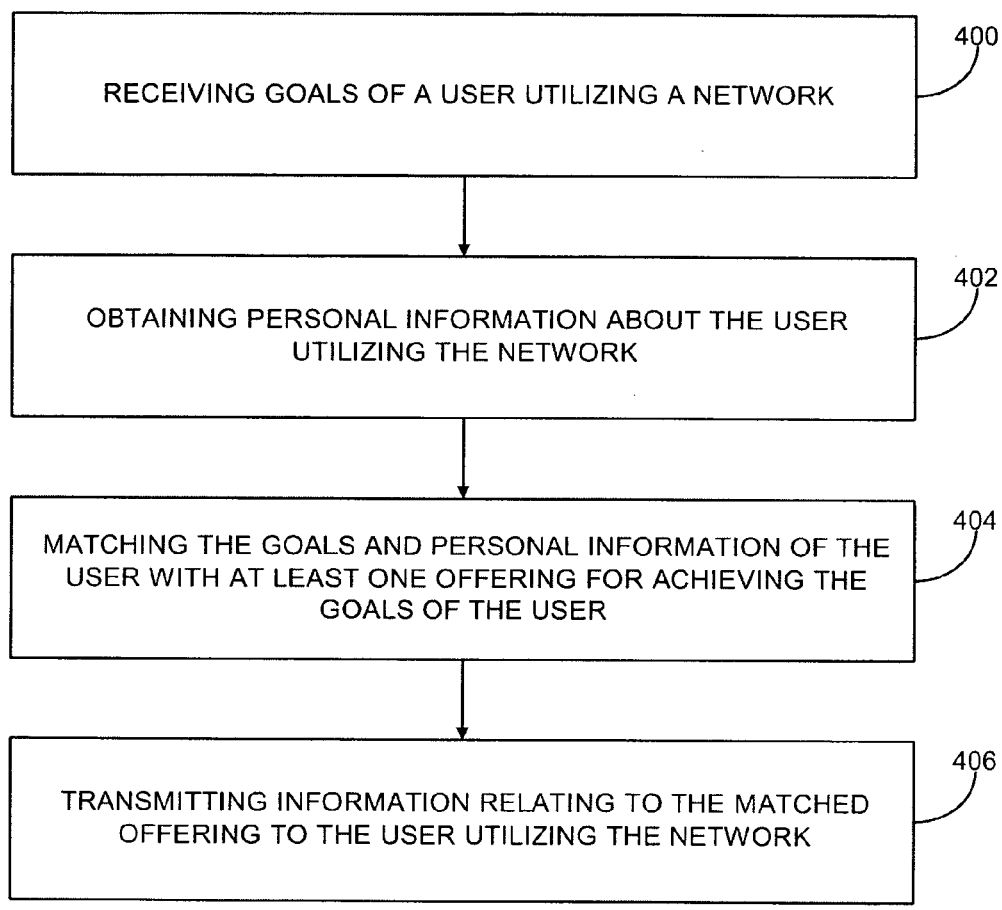
FIG. 4 is a flowchart illustrating a method for providing customized financial instruments in a financial manager in accordance with an embodiment of the present invention.

FIG. 4 is a flowchart illustrating a method for providing customized financial instruments in a financial manager. The invention includes receiving personal information regarding a user, and also receiving financial goals from the user that the user wishes to attain. See operations 400 and 402. Financial instruments are then generated for the user based on the personal information and financial goals of the user, and the generated financial instruments are delivered to the user. See operations 404 and 406, respectively.

An aspect of the present invention is that a network is utilized to deliver the generated financial instruments to the user. Another aspect of the invention is that the network is a wide area network capable of communicating using TCP/IP and IPX protocol. In another embodiment of the invention the generated financial instrument is stored in a database so that it may be retrieved at a later time.

In yet another embodiment of the invention the user is permitted to adjust preferences in attaining the financial goals of the user, and includes the aspect that the generated financial instrument is further based on the adjusted preferences.

Another aspect of the invention is that the financial goals include at least one of: home, vehicle, monthly allowance and savings, planned furniture expenses, planned appliance purchases, vacation, children's education, and retirement home.

In another embodiment of the invention the user is charged a fee for delivering the generated financial instrument. Optionally, the user may receive a bill of the charged fee utilizing the network.

The present invention thus allows automatic creation of custom financial instruments. Since the presnet invention knows what a user needs, it can help design and sell novel financial instruments the customer wouldn't know to look for, or wouldn't bother to pursue.

Figure 5:
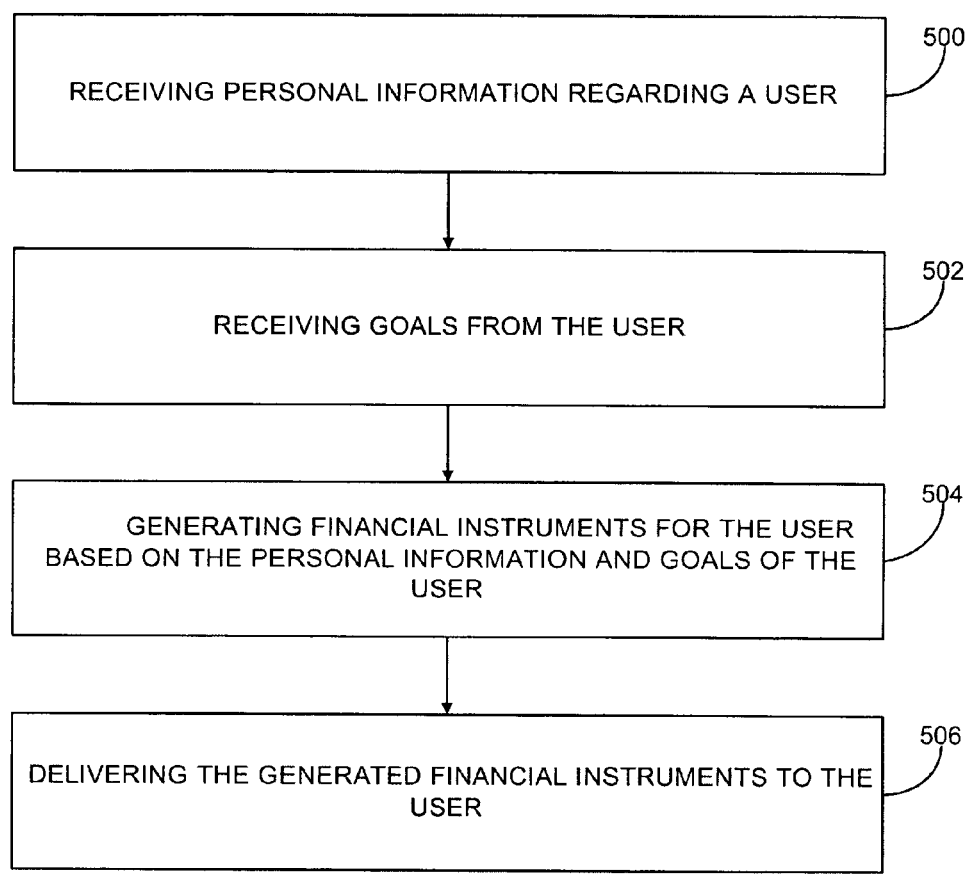
FIG. 5 is a flowchart illustrating a method for obtaining user profile information in a financial manager in accordance with an embodiment of the present invention.

FIG. 5 is a flowchart illustrating a method for obtaining user profile information in a financial manager. First, in operation 500, personal information is obtained on a user. Next, in operation 502, the user is allowed to adjust preferences related to attaining one or more financial goals. An impact is subsequently obtained on attaining the financial goals from the adjustment of the preferences by the user. See operation 504. Then, in operation 506, a profile is then generated on the user based on the adjusted preferences and the personal information of the user. The profile on the user is then transmitted utilizing a network so that the profile may be utilized as market intelligence for another party. See operation 508.

In one embodiment of the present invention, the financial goals of the user include future purchases made by the user. Further, the profile on the user may include information relating to the order in which the user prefers to make the future purchases based on the adjusted preferences.

In another embodiment of the present invention, the preferences may include a quality preference relating to the quality of the achieved financial goal preferred by the user. The user may also adjust the quality preference either to a higher or lower preferred quality. For example, for the financial goal of a new automobile, the user may adjust the preferred quality between a preference for an economy car or a preference for a luxury car.

In still yet another embodiment of the present invention, the preferences may include a time preference relating to how soon the user prefers to achieve the financial goal. The user may adjust the time preference from a sooner or later preferred time of achieving the financial goal. For example, for the financial goal of a vacation, the user may adjust the preferred time between a preference for taking a vacation soon in time or later in time.

In one aspect of the present invention, the transmitted profile on the user may be stored in a database with profiles on other users so that a regional profiles and other regional marketing information may be developed. As an option, the transmitted profile information may be transmitted directly to third parties desiring the profile information. Further, the personal information of the user may include information relating to income or salary of the user.

In still another aspect of the present invention, the personal information of the user includes information relating to the age of the user. The personal information of the user may include information relating to the marital status of the user (i.e., married or single). Further, the personal information of the user may include information relating to the location where the user resides. As an option, the personal information of the user may include information relating to a number of children of the user.

The present invention thus gathers market intelligence by generating unprecedented information on consumer preferences. The present invention has access not only to what consumers intend to buy, but also what they would consider buying under different conditions and how they trade off.

The present invention enables users to make financial decisions by negotiating tradeoffs between personal financial goals. The user interface represents different goals in one person's life, including their home, car, monthly allowance and savings, planned furniture purchase, planned appliance purchase (e.g. TV), vacation, children's education, and retirement home. The present invention allows one to select any of these goals and make adjustments to preferences for the selected goal. These preferences include the priority, expected quality, and expected schedule for attaining the goal. After adjusting the preferences for a selected goal the present invention reallocates funds between goals according to preferences. One can examine the resulting tradeoffs by viewing the changes, which are represented graphically on the screen. The intent is to illustrate a shift in the "conversation" between a financial institution and a customer. Instead of focusing on individual transactions, the present invention enables a lifestyle.

Figure 6:
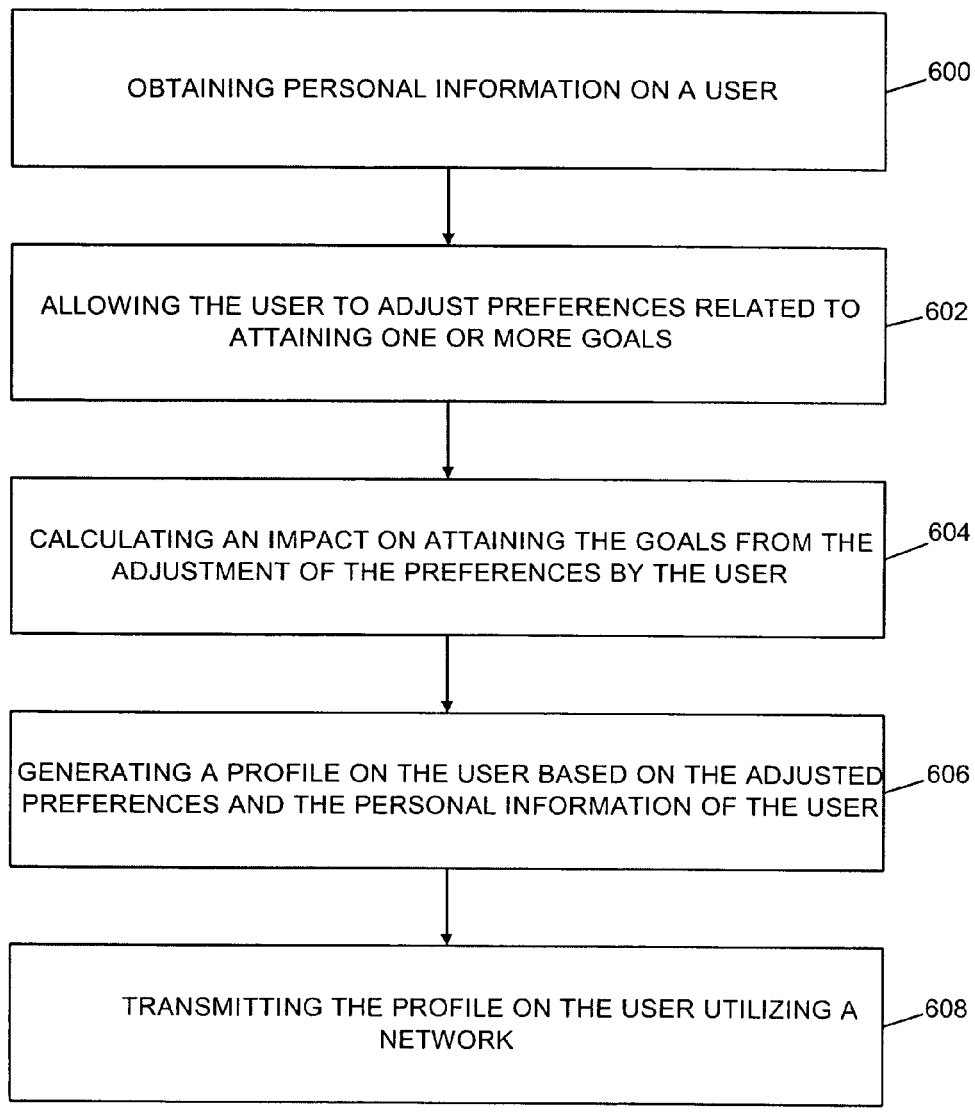
FIG. 6 illustrates a method for providing a financial manager user interface in accordance with an embodiment of the present invention.

FIG. 6 illustrates a method for providing a financial manager user interface. First, in operation 600, a plurality of images are displayed in a frame. Each of the images represent a financial goal of a user. In operation, the user is permitted to select from of the images in the frame, as indicated in operation 602. Further, a user is permitted to adjust preferences related to the financial goal represented by the selected image in the frame. See operation 604. The appearance of one or more of images in the frame is altered based on the adjusted preferences of the financial goal represented by the selected image in operation 606.

Figure 7:
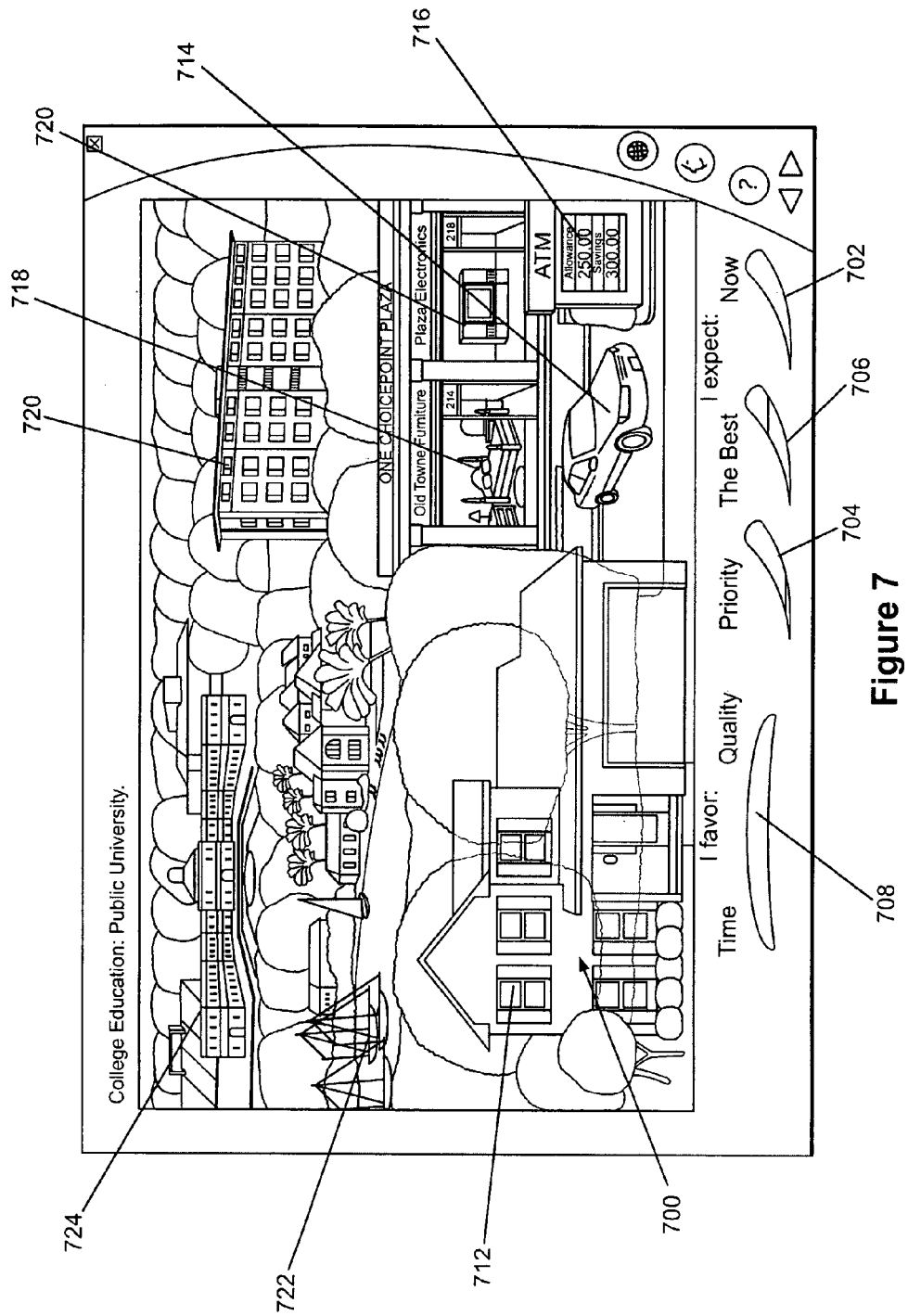
FIG. 7 illustrates an exemplary user interface including a plurality of images for carrying out the method of FIG. 6 in accordance with an embodiment of the present invention.

FIG. 7 illustrates an exemplary user interface including a plurality of images 700 for carrying out the method of FIG. 6 in accordance with one embodiment of the present invention. During use of the user interface, a user is permitted to adjust preferences related to the financial goal by first selecting one of the images 700. For example, time indicia 702 is displayed for permitting the user to adjust a time expectation for the amount of time expected for achieving the financial goal represented by the selected image. As yet another example, priority indicia 704 is displayed for permitting the user to adjust a level of priority for achieving the financial goal represented by the selected image.

In use, the lower the priority selected for the goal, the more transparent or faded the selected image 700 appears. This is to symbolize to the user that attainment of the financial goal is further away in time. In contrast, the higher the priority selected for the financial goal, the less transparent or more filled in the selected image becomes. As illustrated in FIG. 7, the displayed image 700 may be a slidable or scalable bar so that increasing the level of the bar increases the time expectation and decreasing the level of the bar decreases the time expectation for the financial goal.

In another embodiment of the present invention, the user may be permitted to adjust preferences related to the financial goal. In particular, this may be accomplished by displaying quality indicia 706 for permitting the user to adjust a quality expectation for the degree of quality expected for the financial goal represented by the selected image. As an option, an appearance of the selected image may be altered in relation to the adjustment of the expectation with respect to quality for the financial goal. In the present embodiment, the lower the expected quality selected for the goal, an image for a lesser quality item appears to represent that a less luxurious or cheaper version of the goal. In contrast, the higher the quality selected for the financial goal, an image for a higher quality item appears to represent that a more luxurious or more expensive version of the goal. As illustrated in FIG. 7, the displayed image may be a slidable or scalable bar so that increasing the level of the bar increases the quality expectation and decreasing the level of the bar decreases the quality expectation for the financial goal.

In still another embodiment of the present invention, the user may be permitted to adjust preferences adjusting a degree of favoritism between time and quality with respect to the financial goal of the selected image. As illustrated in FIG. 7, priority indicia 708 may be a slidable or scalable bar so that moving the level of the bar towards the quality side of the bar increases the favoring of quality while decreasing the favoring of time while moving the level of the bar towards the time side of the bar increases the favoring of time while decreasing the favoring of quality. It should be noted that the indicia 702–710 is situated on a control panel 711.

Users may thus adjust their expectations for time and quality, how important a goal is (the priority), and the extent to which they prefer to trade off time versus quality for a given goal. The indicia 708 may take the form of a slider that allows the user to set the degree to which they favor time versus quality by adjusting the slider to a position between the two extremes (labeled "time" and "quality"). Settings closer to quality will tend to make concessions on time and improvements on quality, and, of course, the reverse for settings closer to time. The priority of a goal determines how much effort should be made to ensure the user gets their way in that particular goal. Note that the users expectations may be low. A higher priority simply makes it more likely that the users expectations will be met, not that they'll get the most expensive option.

For any given goal, the user can select their expectations for quality and time using the two sliders under the "I expect" label. In each case higher is "better"—that is, for time, the higher the expectation, the sooner one wants it. For quality, the higher the expectation, the better the option one wants.

During use, the demo is preset with one person's goals and a range of options for each goal. Tradeoffs may be of two types: First the quality of an option might change (e.g. a better or worse house may appear). Secondly, the time of attainment for a goal may change (e.g. the time it takes to get a car may go up or down). As set forth earlier, changes in the time of attainment are reflected in changes in the transparency of the goal in question. For example, the longer it takes to attain a car, the more it fades away (i.e. becomes more transparent).

An interaction with the present invention is a continuous process of selecting a goal, adjusting preferences for that goal, and examining the resulting tradeoffs. The user continues this process until they arrive at a set of choices with which they are most comfortable.

In one exemplary embodiment of the present invention, the images 700 representing financial goals of a user may include a first image 712 such as an image of a house for representing a home financial goal, a second image 714 such as an image of a vehicle for representing a vehicle financial goal, a third image such as an image of a ATM 716 for representing a monthly allowance and savings financial goal, a fourth image 718 such as an image of furniture for representing a planned furniture expenses financial goal, a fifth image 720 such as an image of television for representing a planned appliance expenses financial goal, a sixth image 722 such as an image of a vacation spot for representing a vacation financial goal, a seventh image 724 such as an image of a college for representing a children's education financial goal.

Figure 8:
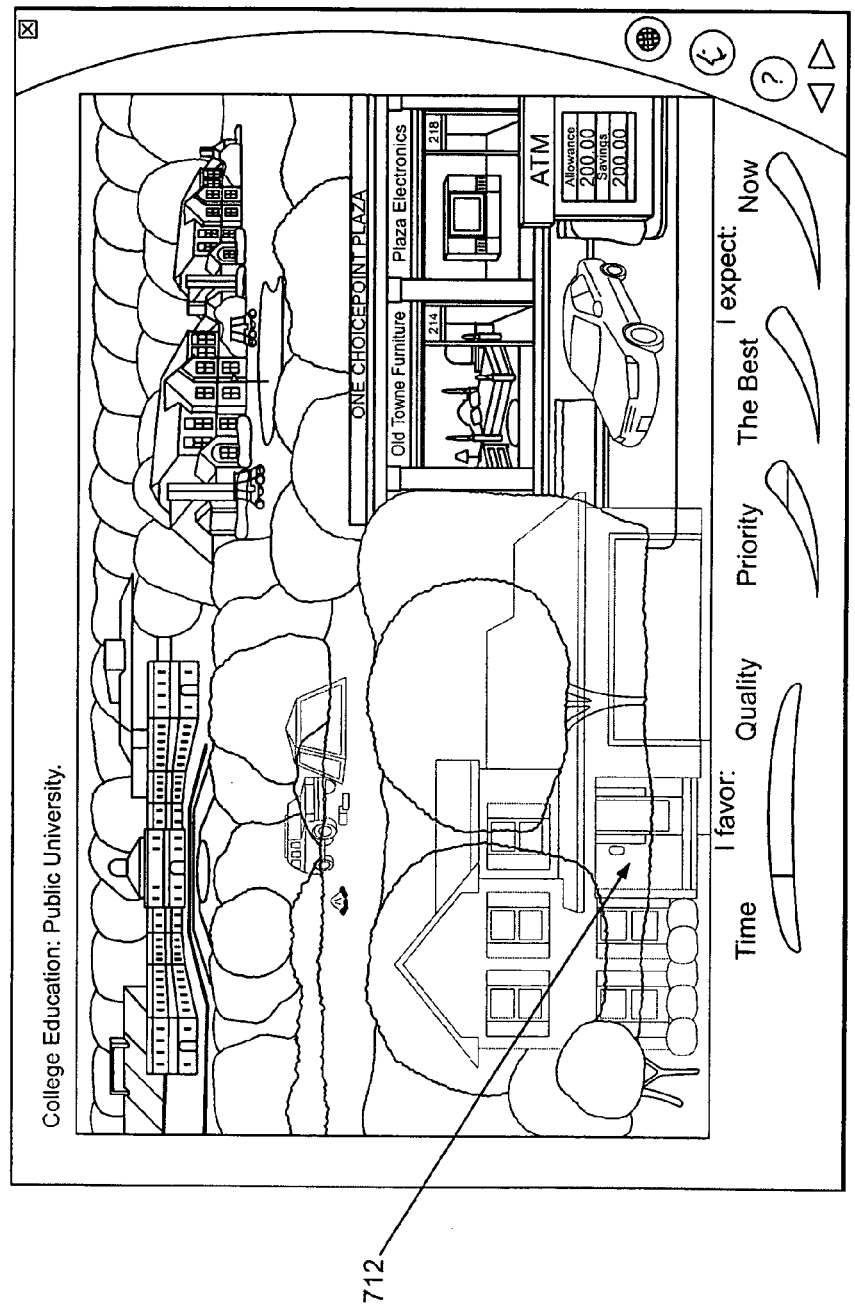
FIG. 8 illustrates the manner in which the images fade inversely proportional to the duration of time budgeted for attaching the financial goal in accordance with an embodiment of the present invention.

During operation, the appearance of one of the images representing a financial goal may fade a shade inversely proportional to the duration of time budgeted for attaching the financial goal. In other words, the longer the duration it will take to obtain the financial goal, the more faded the image representing the financial goal becomes while conversely, the sooner the financial goal will be attained the more filled in or less faded the image for that financial goal will become. FIG. 8 illustrates the manner in which the images fade inversely proportional to the duration of time budgeted for attaching the financial goal. Specifically, the first image 712 of the house in FIG. 8 is shown to fade with respect to FIG. 7.

The main screen area is used to display the goals in a way that reflects the impact of a user's decisions. The more transparent the goal, the further away in time. Selecting the goal will display the precise waiting time along the top part of the screen. The specific picture used to depict a goal corresponds to an option of a certain quality level. For example, cars range from a HONDA CIVIC® to a BMW®, Vacations from camping to Paris, etc. These selections will change depending on the way the user values different goals.

Whenever a change is made, adjustments are made to the goals. At times the readjustment may result in no new changes, but typically adjustments result in one or more changes to other goals. Quality changes are displayed first and appear as animated changes to the choices for the given goal. Goals whose time of attainment change will flash after the quality changes have been shown. Their degree of transparency will change to reflect the new expected time of attainment.

After making a change, a written summary of changes cycles through the control panel area. The control panel can be accessed by simply clicking anywhere outside the boxed area of changes. Clicking within the box will advance to the next screen of changes.

In order to select a goal, a user may click on the same. The selected goal is highlighted and its current option settings are displayed across the top bar of the window. The controls on the bottom of the screen in the control panel (indicia 704–708) govern the selected goal.

As set forth earlier, users can explore decisions by adjusting the preferences of their goals using the controls and viewing the resulting changes. Resulting changes to goals are observable on the main screen, and are summarized in the control panel window below.

Figure 9:
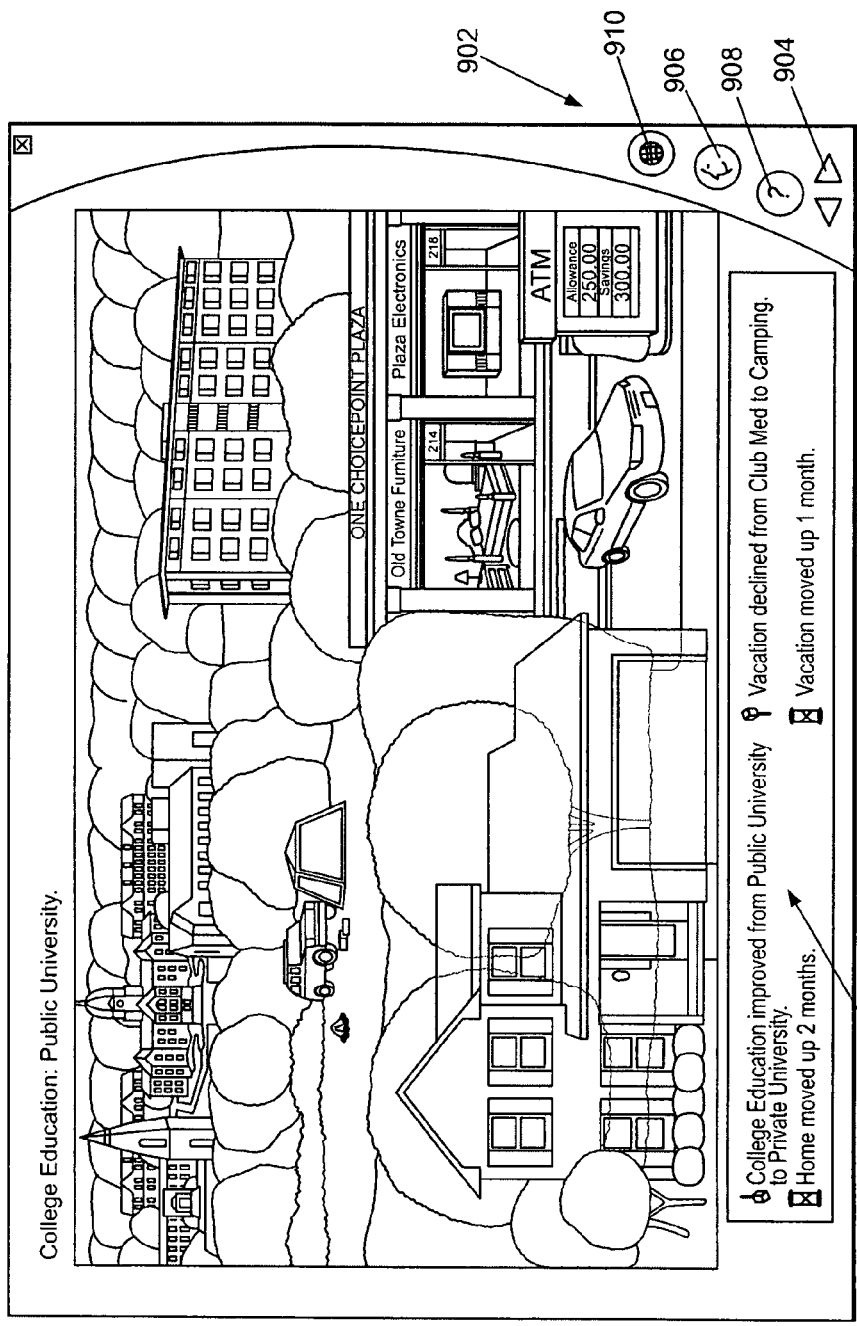
FIG. 9 illustrates a feature wherein the control panel is temporarily replaced by a summary of the changes to the goals in accordance with an embodiment of the present invention.

FIG. 9 illustrates a feature wherein the control panel 711 is temporarily replaced by a summary 900 of the changes to the goals. In particular, when user actions result in changes to other goals (i.e. when tradeoffs are made), the control panel is temporarily replaced by a summary of the changes to the goals. One can cycle through the list of changes manually by clicking within the control panel region, otherwise the changes will cycle on their own after a few seconds. To retrieve the control panel, one need simply to click anywhere outside the box listing the goal changes.

Whether the control panel 711 is shown or not, the bottom right hand of the application may include a series of navigation buttons 902. As an illustration, the navigation buttons 902 may include arrow keys—back & forwards 904, face icon 906, a question mark icon 908, and selectable link 910.

In an aspect of the present invention, the arrow keys 904 may be utilized to cycle through the various financial goals. For example, repeated selection of the forward arrow may allow a user to move from the vacation financial goal, to the home financial goal, and then to the car financial goal.

Figure 11:
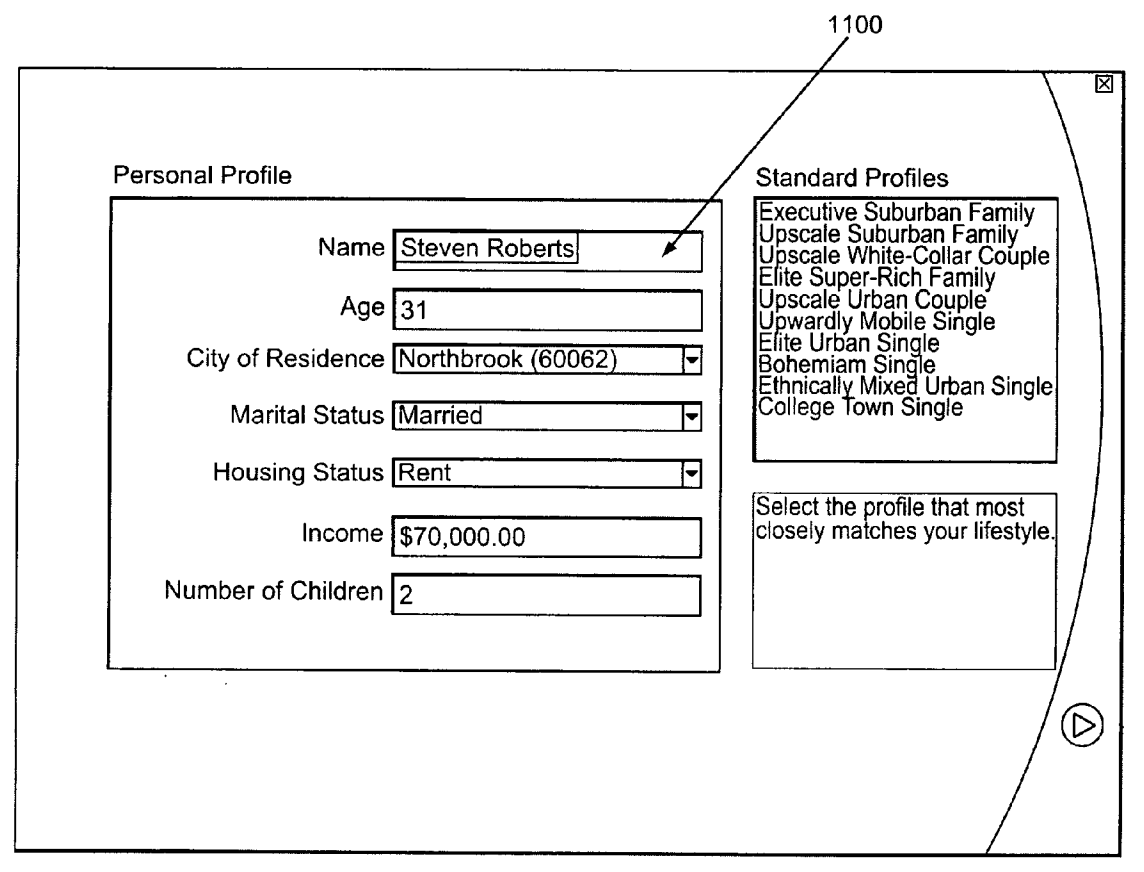

In another aspect of the present invention, the face icon button 906 may serve as a selective link to a personal profile frame 1100 such as the type discussed in FIG. 11. In a further aspect of the present invention, the globe button 910 may serve as a selective link to a financial assumption frame 1000 such as the type discussed in FIG. 10. In yet another aspect of the present invention, the question mark button 908 may serve as a selective link to a help frame to provide help information to a user.

Figure 10:
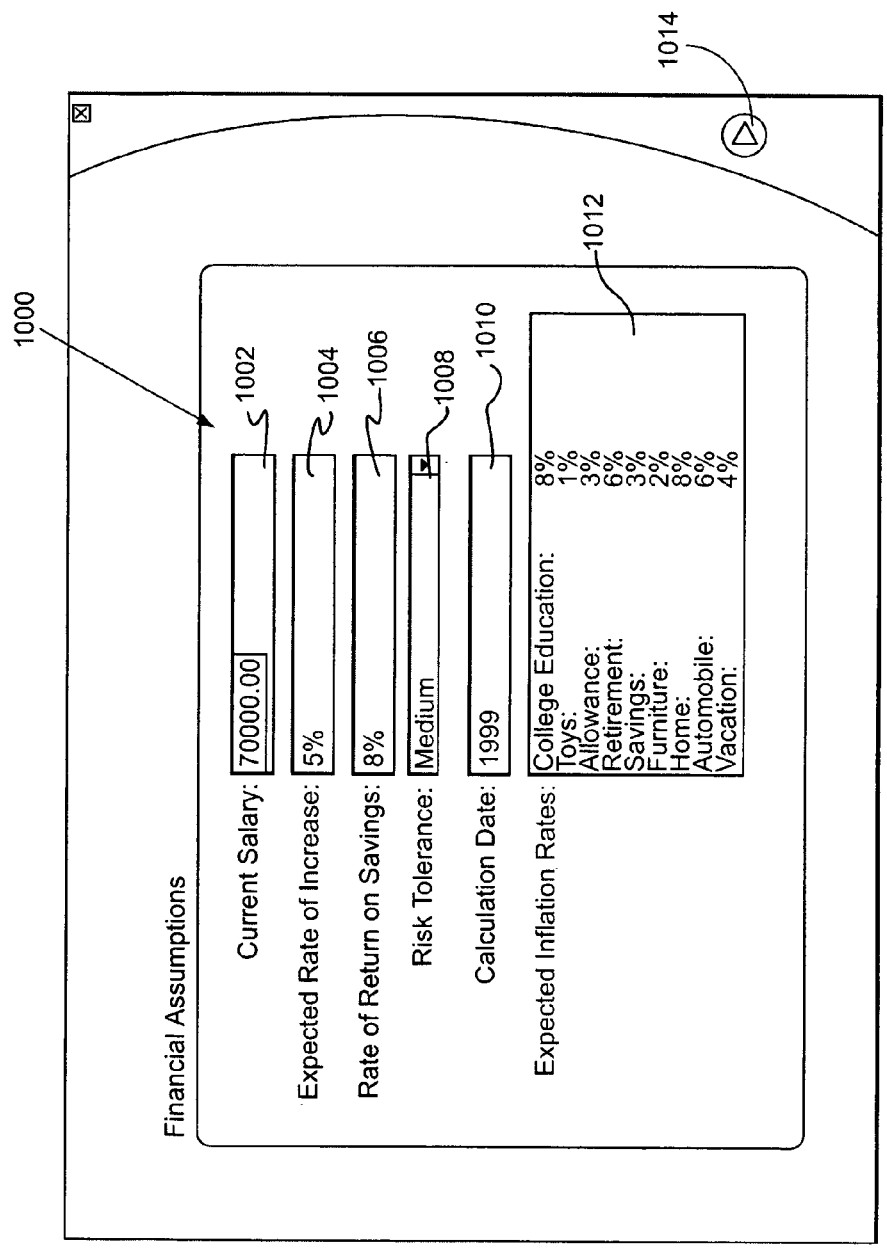
FIG. 10 illustrates a financial assumptions frame which is displayed upon selection of a financial assumptions button of the main frame in accordance with an embodiment of the present invention.

FIG. 10 illustrates a financial assumptions frame 1000 which is displayed upon selection of the financial assumption button 910 of the main frame in accordance with an embodiment of the present invention. In this frame 1000, one or more financial assumptions may be generated which, in turn, may be used in the calculations for determining the impact on attaining the financial goals of the user. As illustrated in FIG. 10, illustrative financial assumption may include the current salary 1002 of a user, expected rate increase in salary 1004, rate of return on savings 1006, risk tolerance of the user (low, medium or high) 1008, calculation date 1010, and expected inflation rates 1012 for each of the financial goals (i.e., expected inflation rates for college education, toys (such as electronics, sporting goods, and other non-essential goods), allowance, retirement, savings, furniture, home, automobile, and vacation). In one embodiment, the user may be permitted to adjust these financial assumptions. In another embodiment, the user may be able to import relevant information into the financial assumptions from various applications including financial management and planning application such as, for example, QUICKEN® and TURBO TAX®.

As an option, the financial assumptions frame 1000 may include a return selectable link 1014 for displaying the main frame (such as the one illustrated in FIG. 7) upon selection thereof.

FIG. 11 illustrates a personal profile frame 1100 which is displayed upon selection of a personal profile button of the main frame in accordance with an embodiment of the present invention. The profile screen is accessed through the button with the face icon 906 of FIG. 9. This screen is intended to illustrate the way information can be entered initially. Rather than relying on the user to enter all information, they can choose from a library of demographic profiles that are likely to contain similar goals and options.

In one aspect of the present invention, a personal profile frame is displayed along with the personal profile frame upon selection of a selectable link 910. A personal profile of the user may also be displayed in the personal profile frame. The financial assumptions are displayed in the financial assumptions frame. As an option, a summary of changes in achieving the financial goals as a result of the adjust preferences may be displayed in the frame.

Figure 12:
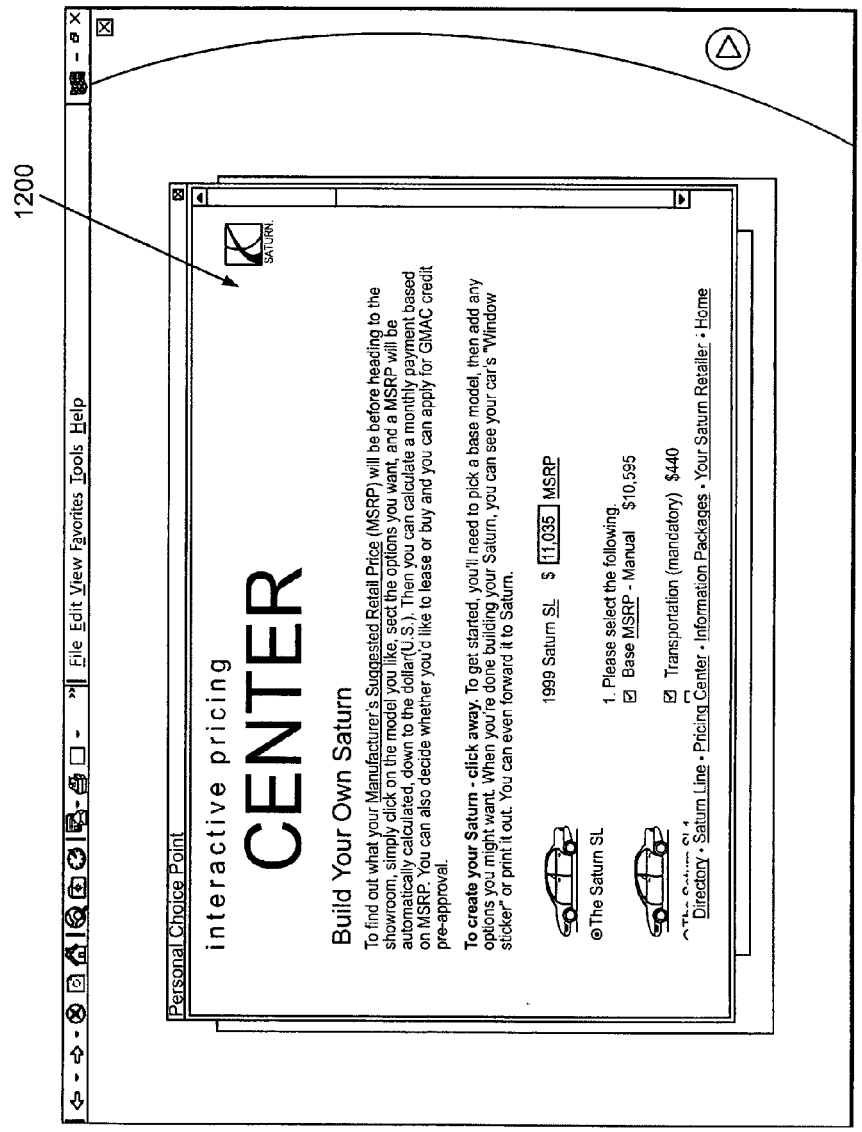
FIGS. 12, 12A, 12B, and 12C illustrate an interactive pricing site which allows a user to select options and pricing for a desired vehicle in accordance with an embodiment of the present invention.
Figure 12A:
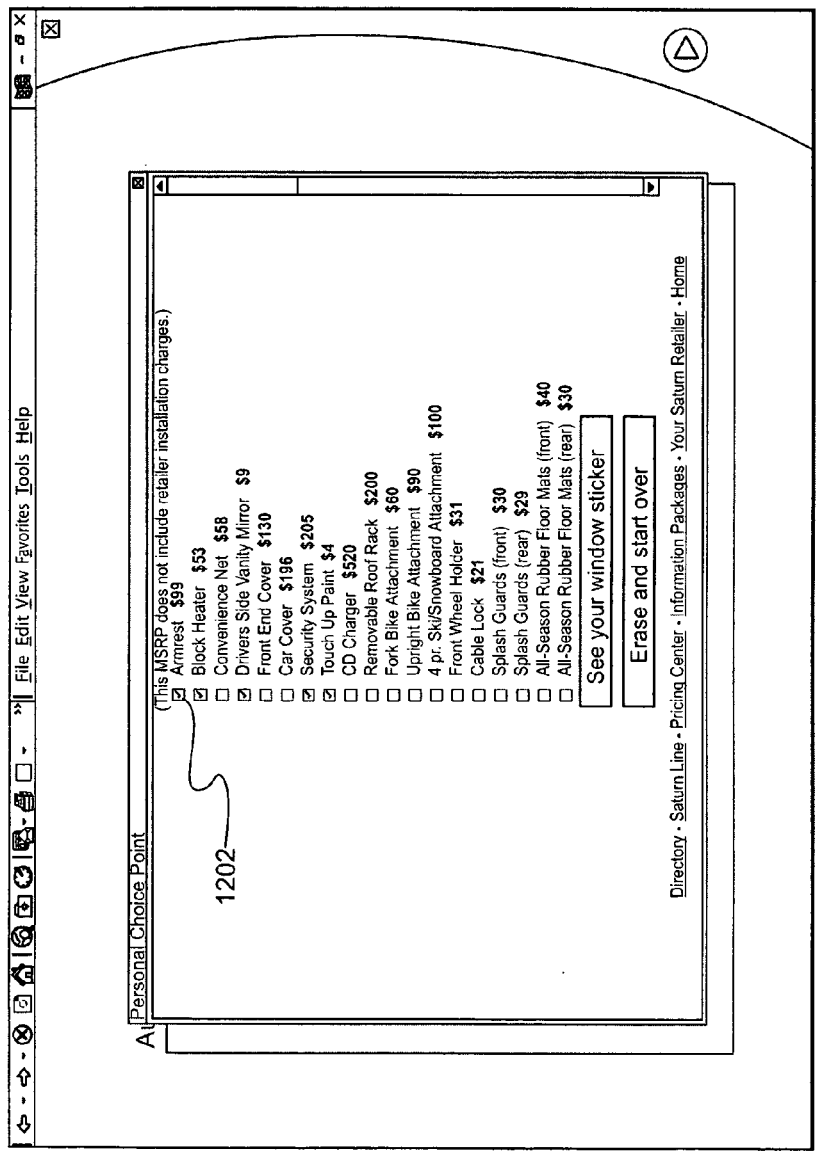
Figure 12B:
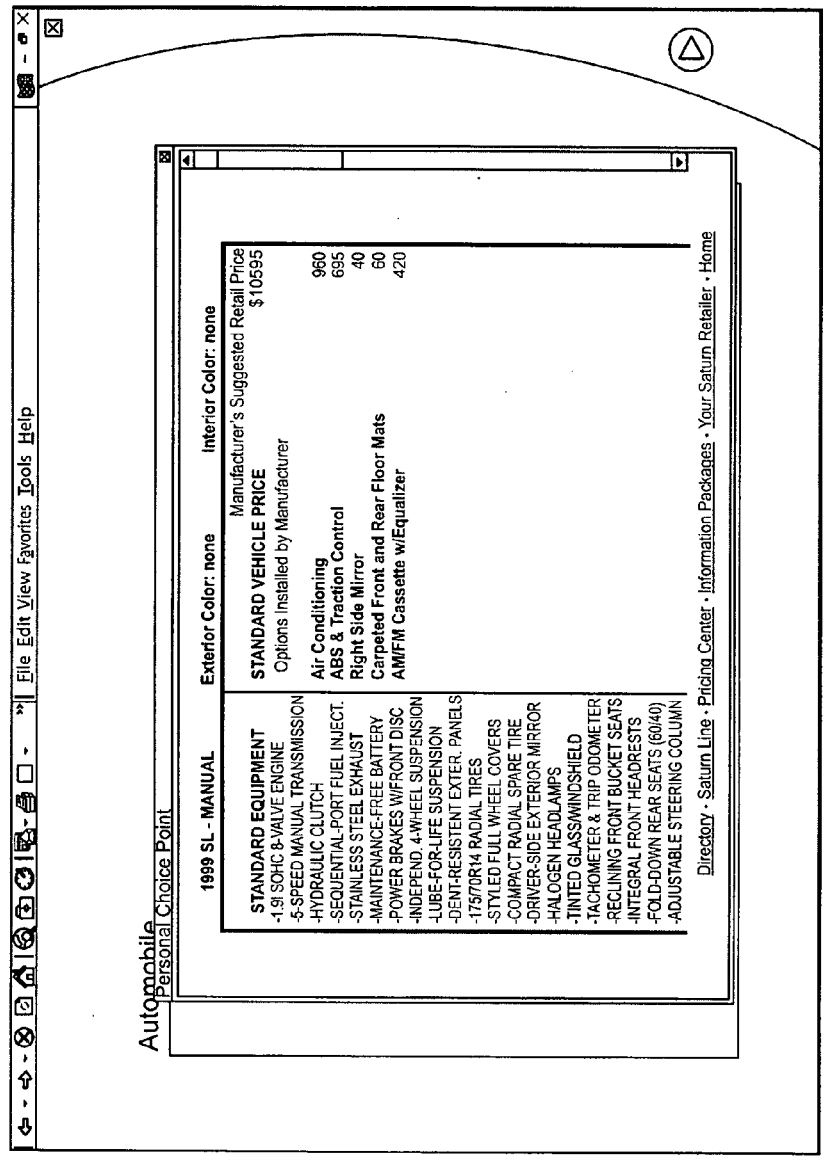
Figure 12C:
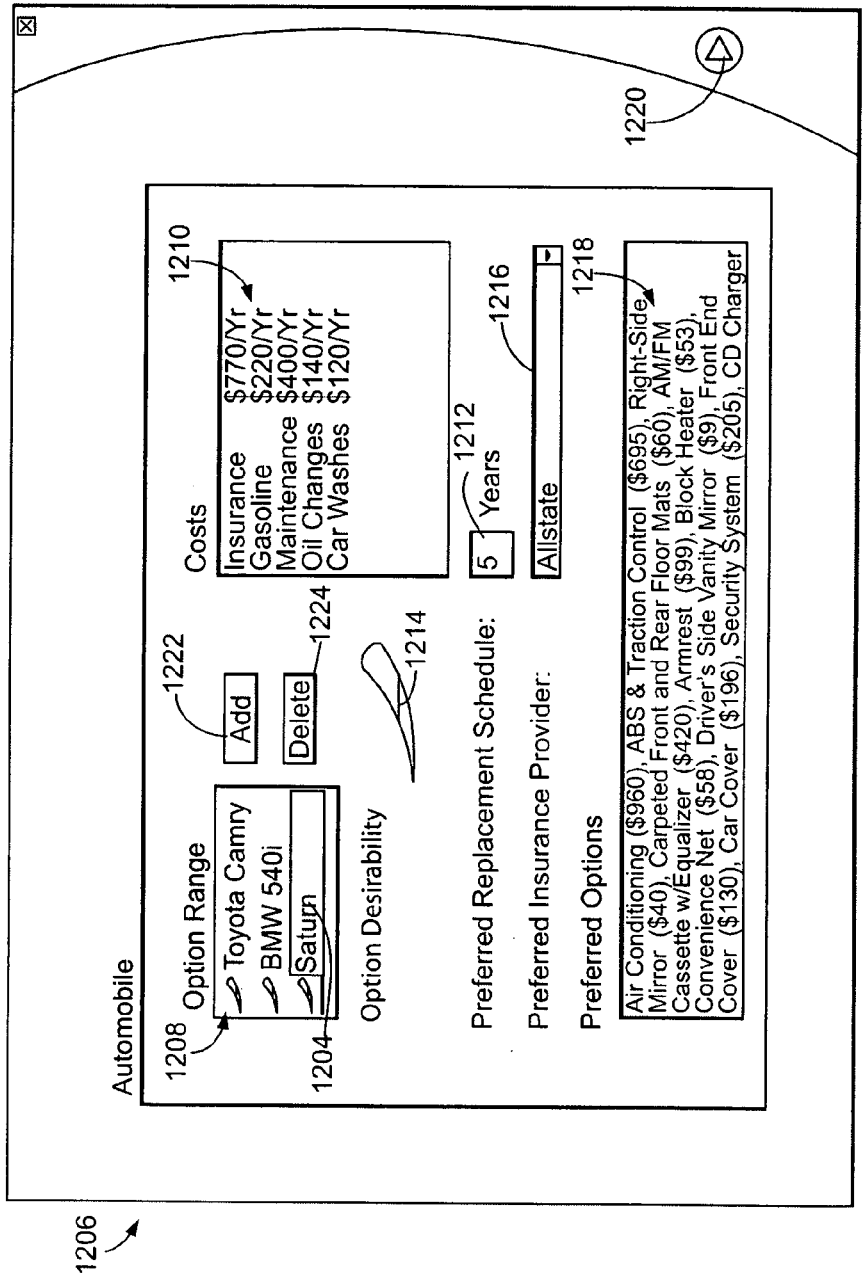

FIGS. 12, 12A, 12B, and 12C illustrates an interactive pricing site 1200 which allows a user to select options and pricing for a desired vehicle in accordance with an embodiment of the present invention. In an illustrative embodiment of the present invention, this frame permits the integrating of a car dealer's web where the user may configure a car as desired by selecting various options 1202 (see FIGS. 12A and 12B) and then incorporate these selected options into a desired car 1204 for the automobile financial goal via an automobile frame 1206 as shown in FIG. 12C.

With continuing reference to FIG. 12C, in an embodiment of the present invention, the automobile frame 1206 may be accessed upon selection of the auto financial goal 714 on the main frame, such as by double clicking on the auto financial goal image 714. In one aspect of the present invention, the automobile frame 1206 may include an option range sub-frame 1208 which displays the automobiles that the user may desire to attain, and a costs sub-frame 1210 which displays cost associated with one of the cars selected in the option range sub-frame 1208 (such as the Saturn model car, for example, as illustrated in FIG. 12C). In aspects of the present invention, the automobile frame 1206, may also include a preferred replacement schedule sub-frame 1212, a slidable optional desirability bar 1214, a preferred insurance provider pull-down menu 1216, and a preferred options sub-frame 1218 which displays options desired by the user for the selected auto model. As a further option, the automobile frame 1206 may also include a return selectable link 1220 for returning the user to the main frame upon selection thereof.

The automobile frame 1206 may also include add and delete buttons 1222, 1224 for adding and removing auto models from the option range sub-frame 1208. In one embodiment of the present invention, a user wishing to add an automobile model to the option range sub-frame 1208 may select the add button 1222, (which may be linked to the interactive pricing site 1200) to thereby display the interactive pricing site 1200 so that the user can configure a car model as desired. Further, upon selection of the delete button 1224, a highlighted auto model (such as the Saturn model as illustrated in FIG. 12C) may be removed from the option range sub-frame 1208 by the user.

In one embodiment of the present invention, the step of adding an additional option to the option range of the financial goal further includes selecting a provider such as an automobile manufacture like SATURN®, and selecting an option provided by the selected provider such as, for example a SATURN SL®. The selected option is then added to the option range of the financial goal. As an option, the selected provider may be selected from a list of a plurality of providers (e.g., a list of automobile manufactures).

Figure 13:
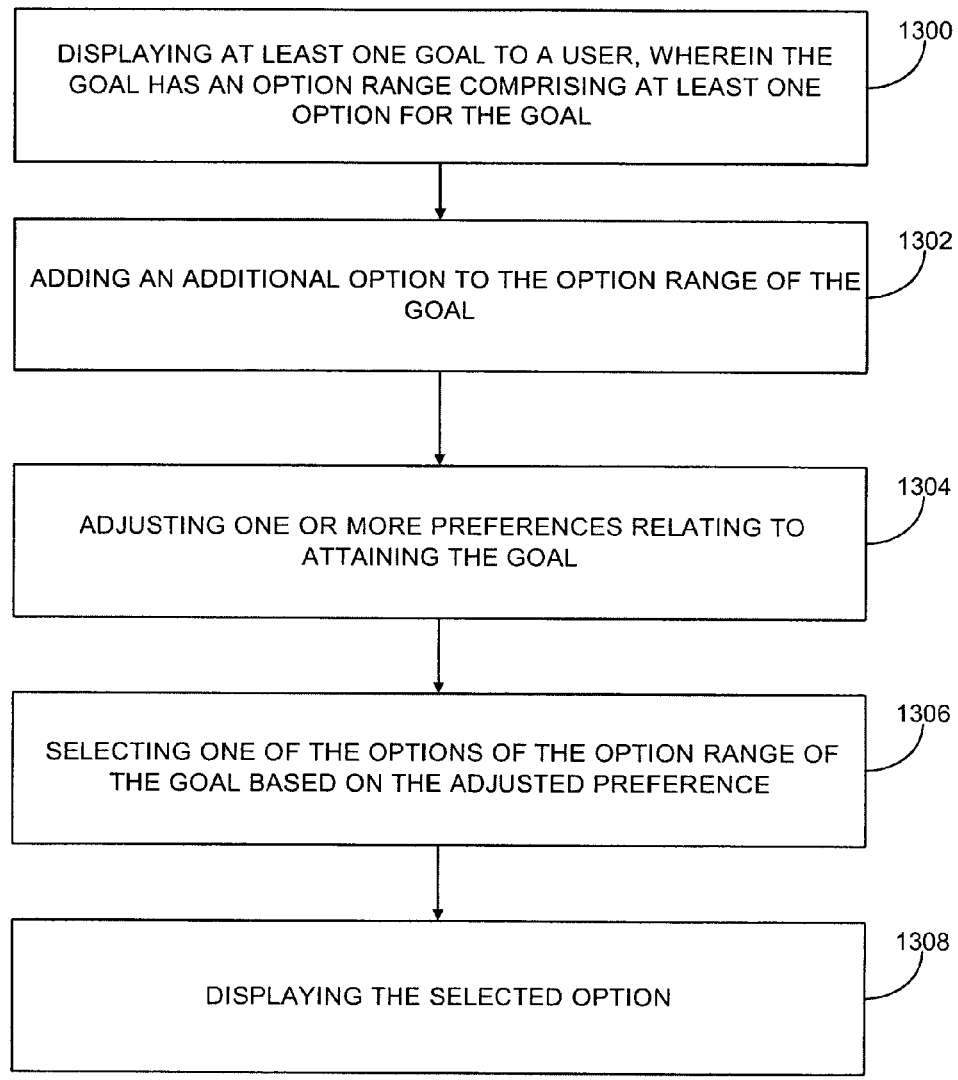
FIG. 13 is a flowchart illustrating a method for brokering and outsourcing in a financial manager in accordance with an embodiment of the present invention.

FIG. 13 is a flowchart illustrating a method for brokering and outsourcing in a financial manager. First, in operation 1300, at least one financial goal is displayed to a user such as a goal of obtaining a new car. The financial goal has an option range includes at least one option for the goal. For example, in the goal for obtaining a new car, the options may comprise different models of cars that the user may wish to obtain such as a HONDA CIVIC®, a TOYOTA CAMRY®, or a BMW 540i®. Subsequently, in operation 1302, the user is permitted to add an additional option to the option range of the financial goal such a new model of car such as a SATURN SL®. The user is further permitted to adjust one or more preferences relating to attaining the financial goal. See operation 1304. Also, one of the options of the option range of the financial goal may be selected based on the adjusted preference. This selection is done by determining which option in the option range best fits the preferences of this option and the preferences for the other financial goals of the user. Such selected option may also be displayed to the user. See operation 1306.

In another embodiment of the present invention, features for the selected option may be added. For example, armrest and security system features may be added to the selected car model. A user-inputted replacement schedule may be provided for replacing the financial goal. Such replacement schedule may include a duration of time that the goal is expected to be held by the user before replacement. The user may also be permitted to select an insurance provider from a list of insurance providers for insuring the financial goal. As an option, features of the selected option for the financial goal may be displayed.

In one aspect of the present invention, the user may be permitted to select an option desirability for the selected option to reflect the user's desirably in obtaining the selected option. Further, the financial goal may be selected from at least one of: home, vehicle, monthly allowance and savings, planned furniture expenses, planned appliance purchases, vacation, children's education, and retirement home.

Figure 14:
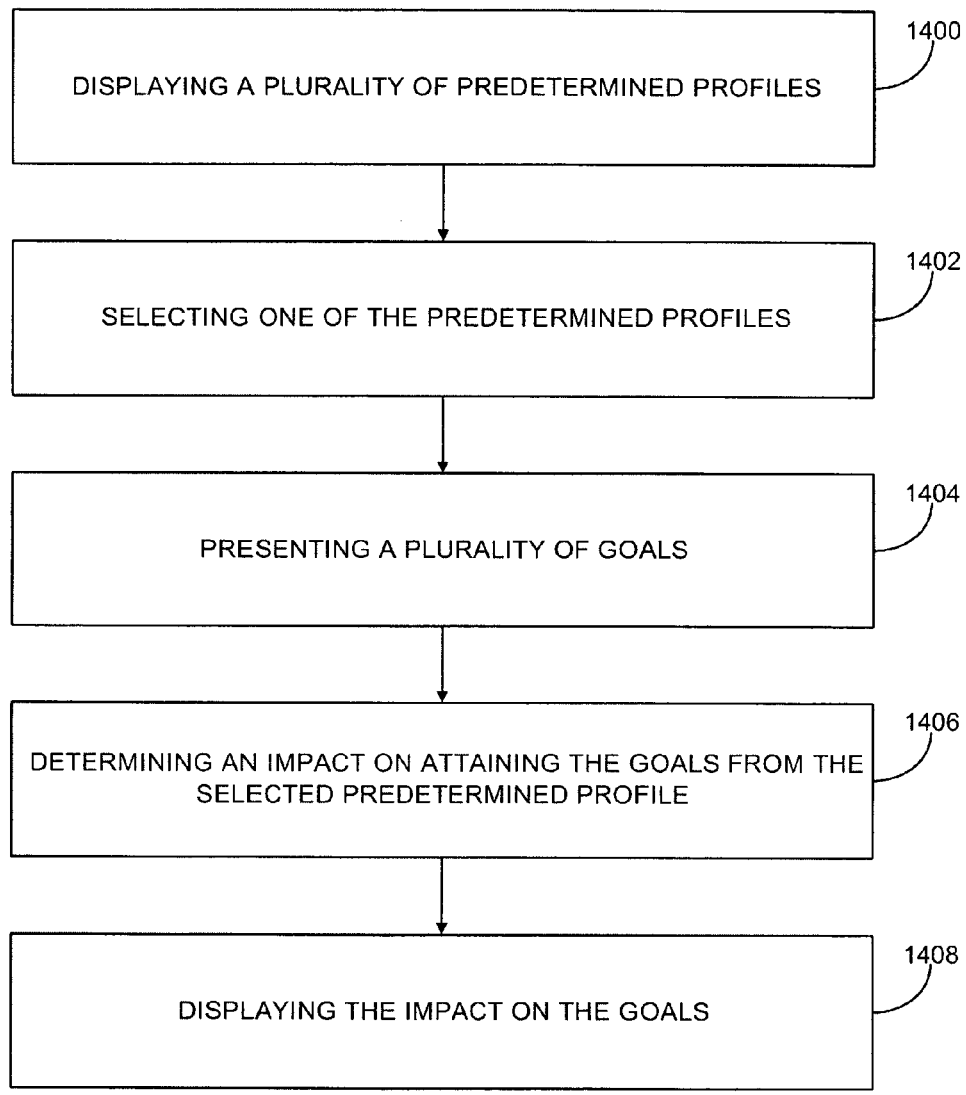
FIG. 14 is a flowchart illustrating a method for providing default profiles for a financial manager in accordance with an embodiment of the present invention.

FIG. 14 is a flowchart illustrating a method for providing default profiles for a financial manager. First, in operation 1400, a plurality of predetermined standardized profiles are displayed to a user in a list. The user is permitted to select one of the predetermined standardized profiles. See operation 1402. Further, in operation 1404, a plurality of financial goals may be presented to the user. An impact on attaining the financial goals from the selected predetermined profile is first determined in operation 1406. The impact on the financial goals is then displayed to the user in operation 1408. It should be noted that such impact may refer to reporting the changes to the user's goals or just on the underlying financial situation (i.e. reporting the impact on the user's life rather than his or her accounts).

In one embodiment of the present invention, the user is permitted to modify the predetermined profile to more accurately fit the user's personal profile. Initial profile information is first received from a user. As an option, the predetermined standardized profiles that are displayed in the list may be dependant on the information received from the user.

In another embodiment of the present invention, the initial profile information of the user includes information relating to a location where the user resides. The initial profile information of the user may also include information relating to a marital status of the user selection from at least one of married and single. As an option, the initial profile information of the user may include information regarding whether the user rents or owns a residence. Further, the initial profile information of the user may include information regarding a number of dependants of the user.

In still another embodiment of the present invention, at least one financial assumption may be generated, and the impact on attaining the financial goals may include a determination as to the impact on the financial assumptions on attaining the financial goals. The financial assumptions may include current salary, expected rate increase in salary, rate of return on savings, risk tolerance of the user (low, medium or high), calculation date, and expected inflation rates for each of the financial goals (i.e., expected inflation rates for college education, toys (such as electronics, sporting goods, and other non-essential goods), allowance, retirement, savings, furniture, home, automobile, and vacation). In one embodiment, the user is permitted to adjust the financial assumptions.

A case scenario of use of the present invention will now be set forth below in Example I:

EXAMPLE I

Let's say you're used to driving a CAMRY® and you're considering buying a BMW®. How do you know if you can afford it?

More generally, how do you know if you can afford something?

Well, you could turn to QUICKEN®.

But what does QUICKEN® do for you? They basically took my checkbook and put it on the screen. It's incredibly useful in lots of ways, and has lots of fancy features, but does it answer my question?

After all, there's a sense in which if I really want it, I can probably afford most purchases I would bother to seriously consider.

But think about it. It's not about numbers. It's about the tradeoffs you'll have to make. Whether you can afford the car really depends on the kinds of compromises you'll have to make in other areas of your life. Will you still be able to go on vacation this Christmas? The monthly car figures just can't tell you.

So deciding you can afford something is really a question of determining what the tradeoffs are, and deciding you're comfortable with them.

Personal Choice Point is an approach to managing your money with just this idea in mind.

{Show the application}

Rather than focus on individual transactions, Personal Choice Point allows you to manage your finances by adjusting your goals and examining the impact on other goals—goals like those you see here—housing, vacation, savings, retirement, and so on. These are just those that might correspond to one typical person.

Personal Choice Point hides the finances and the numbers and basically lets me see what's possible with what I have and what I want. The focus changes from my accounts, to my life.

{Click on the Car picture}

Right now, based on my preferences, I'm set to get a CAMRY® in 40 months, but suppose I want to get a BMW®. At an earlier point I'd specified the range of cars I'd consider getting. So now I can raise my quality expectations for cars.

{Raise the quality expectation ("The Best" slider) to the highest point}

So now we see a number of changes have taken place. We see we're getting our BMW®, but we've had to make sacrifices in other areas.

We see, for example, that the house is starting to fade away, that means we have to wait longer for it. And notice that now we're going camping when before we were going to CLUB MED®. A summary of the changes is listed down here. Note that these changes are not financial changes, they're changes to my lifestyle.

So can we afford the car? Well, if we're satisfied with these tradeoffs then yes. Otherwise, we either can't afford the car, or we can try to find a set of tradeoffs we are comfortable with. For example, I may really want to go on that beach vacation.

{Click outside the changes box on the bottom to retrieve the control panel}

So let's raise the priority of the vacation.

{Click on the vacation—should be camping now—to select it}

{Click very high on the priority to raise the priority of vacation}

Now we see we got our beach vacation back . . .

{Click the space bar to toggle the highlighting}

. . . but the house is getting either further away. So we can continue this until we find an outcome we're happy with, or—as most of us wind up having to do—the one we're most willing to live with . . .

So why would a financial services company care about this? Or a products company? Or any company for that matter?

Well for one, There's an incredible amount of information about the user here. Personal Choice Point would provide an unprecedented wealth of data not just on what consumers intend to buy, but on what they would consider buying, and, in effect, the financial conditions under which they would do so. This enables both very precise marketing to individuals and insight into markets for various products. If I know you're buying a CAMRY® in 15 months, then I know when you'll need a car loan.

Now we'll add the Saturn:

{Click on "Add" button. A dialog will popup to enable you to select a manufacturer. Scroll down list of manufacturers by clicking repeatedly on down arrow at bottom of select manufacturer dialog.

Double click on Saturn. A window with Saturn's web site should pop up.}

What we've done is illustrate this outsourcing potential by integrating the Saturn Web Site. We can now configure the Saturn we want on their site and incorporate these options into Personal Choice Point.

{—Click on a few options: e.g. air conditioning, ABS, am/fm cassette . . . Scroll down and press "see your window sticker"}

The options reflected here are now integrated into Personal Choice Point.

{Close the Saturn window (click on "X" in upper right corner of Saturn Window)}

These options are now listed under the preferred options window.

Of course this is a simple example, but the point is clear. Third party service and product providers can be included and their information taken into account in planning. By including these third party providers, the financial services company is now at the center of the transaction and becomes a broker for a wide variety of products and services.

{Press return arrow on bottom right to return to main screen}

Optional demo branch 2: Default Profiles

This branch illustrates how preferences are initially set.

Given the tremendous amount of information that's in here, people are often concerned that it would be too painful to enter in all this information. There are a number of ways to address this concern. First, let me admit that yes, there will be startup costs, but it won't be as bad as it may seem. First, consider that this is information that will be accumulated over time. Also, if we are working with third party product and service providers, we can incorporate many of your existing preferences directly from there. Thirdly, consider that your preferences are not really all that unique. In fact, their likely to correspond reasonably closely to others like you. So rather than start from scratch, we can begin with a number of default profiles that you can alter.

{Click on profile button (button with face) on bottom right hand corner of main screen, click on different profiles to display}

These example profiles, for example, were taken from the Claritas corporation, a market research company, and describe different clusters of people in different socioeconomic situations. After all, my preferences are likely to be similar to others like me who live where I do and make what I make and are my age. What I would do at this point is select the profile that most closely matches me, and then modify the goals associated with that profile, rather than begin from scratch.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for providing a user interface, comprising the steps of:
   (a) displaying a plurality of images in a frame, each of the images representing a goal;
   (b) permitting a user to select from the images in the frame;
   (c) permitting the user to adjust preferences related to the goal represented by the selected image in the frame; and
   (d) altering the appearance of one or more of the images in the frame based on the adjusted preferences of the goal represented by the selected image, wherein the appearance of one of the images representing a financial goal fades a shade inversely proportional to the duration of time budgeted for attaining the financial goal.

2. A method as recited in claim 1 further comprising:
   requesting personal information on the user;
   receiving the requested personal information;
   generating a personal profile corresponding to the adjusted preferences and the personal information.

3. A method as recited in claim 2 further comprising:
   (a) displaying a selectable link to a personal profile frame, and
   (b) displaying the personal profile within the personal profile frame upon selection of the link.

4. A method as recited in claim 1 further comprising:
   (a) displaying a time indicia representing a time expectation for the amount of time expected for achieving one goal represented by the selected image;
   (b) permitting the user to adjust the time indicia; and
   (c) displaying the effect of the adjustment.

5. A method as recited in claim 1 further comprising:
   (a) displaying a quality indicia representing a degree of quality for the goal represented by the selected image; and
   (b) permitting the user to adjust the quality indicia; and
   (c) displaying the effect of the adjustment.

6. A method as recited in claim 5 wherein an appearance of the selected image is altered in relation to the adjustment of the quality indicia with respect to quality for the goal.

7. A method as recited in claim 1 further comprising:
   displaying a degree of favoritism indicia representing the degree of favoritism between time and quality with respect to the goal represented by the selected image; and
   permitting the user to adjust degree of favoritism indicia.

8. A method as recited in claim 1 further comprising:
   displaying a selectable link to a financial assumptions frame, and
   upon selection of the link, displaying the financial assumptions frame populated by data representing financial assumptions.

9. A method as recited in claim 1 further comprising:
   displaying a summary of impacts on achieving the goals resulting from the adjusted preferences.

10. A method as recited in claim 1 wherein the images representing goals include at least one of: a first image representing a home goal, a second image representing a vehicle goal, a third image representing a monthly allowance and savings goal, a fourth image representing a planned furniture expenses goal, a fifth image representing a planned appliance expenses goal, a sixth image representing a vacation goal, and a seventh image representing a children's education goal.

11. A computer program embodied on a computer readable medium for providing a user interface, comprising:
   (a) a code segment for displaying a plurality of images in a frame, each of the images representing a goal;
   (b) a code segment for permitting a user to select from the images in the frame;
   (c) a code segment for permitting the user to adjust preferences related to the goal represented by the selected image in the frame;
   (d) a code segment for altering the appearance of one or more of the images in the frame based on the adjusted preferences of the goal represented by the selected image, wherein the appearance of one of the images representing a financial goal fades a shade inversely proportional to the duration of time budgeted for attaining the financial goal.

12. The computer program of claim 11 further comprising:
   a code segment for requesting personal information on the user;
   a code segment for receiving the requested personal information;
   a code segment for generating a personal profile corresponding to the adjusted preferences and the personal information.

13. The computer program of claim 12 further comprising:
   (a) a code segment for displaying a selectable link to a personal profile frame, and
   (b) a code segment for displaying the personal profile within the personal profile frame upon selection of the link.

14. The computer program of claim 11 further comprising:
   (a) a code segment for displaying a time indicia representing a time expectation for the amount of time expected for achieving one goal represented by the selected image;
   (b) a code segment for permitting the user to adjust the time indicia; and
   (c) a code segment for displaying the effect of the adjustment.

15. The computer program of claim 11 further comprising:
   (a) a code segment for displaying a quality indicia representing a degree of quality for the goal represented by the selected image; and
   (b) a code segment for permitting the user to adjust the quality indicia; and
   (c) a code segment for displaying the effect of the adjustment.

16. The computer program of claim 15 wherein an appearance of the selected image is altered in relation to the adjustment of the quality indicia with respect to quality for the goal.

17. The computer program of claim 11 further comprising:
   a code segment for displaying a degree of favoritism indicia representing the degree of favoritism between time and quality with respect to the goal represented by the selected image; and
   a code segment for permitting the user to adjust degree of favoritism indicia.

18. The computer program of claim 11 further comprising:
   a code segment for displaying a selectable link to a financial assumptions frame, and
   a code segment for, upon selection of the link, displaying the financial assumptions frame populated by data representing financial assumptions.

19. The computer program of claim 11 further comprising:
   a code segment for displaying a summary of impacts on achieving the goals resulting from the adjusted preferences.

20. The computer program of claim 11 wherein the images representing goals include at least one of: a first image representing a home goal, a second image representing a vehicle goal, a third image representing a monthly allowance and savings goal, a fourth image representing a planned furniture expenses goal, a fifth image representing a planned appliance expenses goal, a sixth image representing a vacation goal, and a seventh image representing a children's education goal.

* * * * *

UNITED STATES PATENT AND TRADEMARK OFFICE
CERTIFICATE OF CORRECTION

PATENT NO. : 7,231,608 B1 Page 1 of 2
APPLICATION NO. : 09/520580
DATED : June 12, 2007
INVENTOR(S) : Andrew E. Fano et al.

It is certified that error appears in the above-identified patent and that said Letters Patent is hereby corrected as shown below:

Title Page

Item (54) Title: after "FINANCIAL MANAGER USER INTERFACE" delete "AS FILED"

Column 5, line 1, delete "apperance" and insert --appearance--

Column 23, after line 33 insert the following:

--The present invention is thus a tool that both manages and executes these various purchases and transactions. That is, a financial services company might offer the present invention to a consumer as a lifestyle management service through which their various goals are supported. If a consumer adhered to the plans designed through the present invention, the company might even guarantee the products and services specified. The consumer need not worry about the particular financial instruments required to achieve the lifestyle in question. At this point the financial services company is arguably in a position to create and sell a wide array of new instruments that need not be individually marketed to consumers. At the same time, they become demand aggregators and will be in a position to negotiate with products and service providers on behalf of their customers. They will have inserted themselves right in the critical path for decision making in many of the crucial aspects of the consumers life.

Ultimately, the conversation between the company and customer changes from being about transactions and balances, to being about goals and lifestyles. In effect, we believe that in the long run, applications such as these will enable financial services to compete on their ability to enable and provide desired lifestyles, rather than marginally better interest rates. The possibilities are endless.

Outsourcing/Intentional networks:
This portion is intended to expand upon and illustrate the potential to include third party product and service providers.
Now, of course no one company will provide all the products and services in everyone's life. What we expect is that the financial services company that deploys such a tool will be in a position to broker and outsource the various goals. For example, let's take a closer look at the car;
*{Double-click on the car -- Should go to an Automobile options screen}*
Here we see the range of options we've specified for our car. We see, for example, that in order of increasing desirability we've indicated a CIVIC®, CAMRY®, and BMW 540®. Now suppose we want to replace the CIVIC® with another modest choice, a SATURN®. So we'll delete the CIVIC®:
*{Highlight the "HONDA CIVIC®" in the option range List Box and then click "Delete"}*--

UNITED STATES PATENT AND TRADEMARK OFFICE
CERTIFICATE OF CORRECTION

PATENT NO. : 7,231,608 B1
APPLICATION NO. : 09/520580
DATED : June 12, 2007
INVENTOR(S) : Andrew E. Fano et al.

It is certified that error appears in the above-identified patent and that said Letters Patent is hereby corrected as shown below:

Column 23, line 34: delete "Saturn" and insert --SATURN®--

Column 23, line 39: delete "Saturn" and insert --SATURN®--

Column 23, lien 39: delete "Saturn's" and insert --SATURN'S®--

Column 23, line 42: delete "Saturn" and insert --SATURN®--

Column 23, line 43: delete "Saturn" and insert --SATURN®--

Column 23, line 50: delete "Saturn" and insert --SATURN®--

Column 23, line 51: delete "Saturn" and insert --SATURN®--

Signed and Sealed this

Thirty-first Day of July, 2007

JON W. DUDAS
*Director of the United States Patent and Trademark Office*